US009940157B2

(12) United States Patent
Yoshida

(10) Patent No.: US 9,940,157 B2
(45) Date of Patent: Apr. 10, 2018

(54) COMPUTER READABLE MEDIUM, METHOD, AND MANAGEMENT DEVICE FOR DETERMINING WHETHER A VIRTUAL MACHINE CAN BE CONSTRUCTED WITHIN A TIME PERIOD DETERMINED BASED ON HISTORICAL DATA

(71) Applicant: FUJITSU LIMITED, Kawasaki-shi, Kanagawa (JP)

(72) Inventor: Taketoshi Yoshida, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 85 days.

(21) Appl. No.: 15/156,652

(22) Filed: May 17, 2016

(65) Prior Publication Data

US 2016/0364259 A1 Dec. 15, 2016

(30) Foreign Application Priority Data

Jun. 10, 2015 (JP) ................................ 2015-117753

(51) Int. Cl.
*G06F 9/455* (2018.01)
*G06F 9/50* (2006.01)

(52) U.S. Cl.
CPC ............ *G06F 9/45558* (2013.01); *G06F 9/50* (2013.01); *G06F 9/45533* (2013.01); *G06F 9/5011* (2013.01); *G06F 9/5077* (2013.01)

(58) Field of Classification Search
None
See application file for complete search history.

(56) References Cited

U.S. PATENT DOCUMENTS 8,738,333 B1 * 5/2014 Behera .................. G06F 9/5061 703/2
9,246,828 B1 * 1/2016 Tagore .................... H04L 47/25
9,256,452 B1 * 2/2016 Suryanarayanan ..... G06F 9/455
9,749,207 B2 * 8/2017 Liu ..................... G06F 11/3409
(Continued)

FOREIGN PATENT DOCUMENTS

JP 2012-208580 10/2012
JP 2013-190888 9/2013
WO WO 2012/137272 A1 10/2012

*Primary Examiner* — Abu Zar Ghaffari
(74) *Attorney, Agent, or Firm* — Staas & Halsey LLP

(57) ABSTRACT

A method includes: when receiving an acquisition request, including performance condition, that requests first virtual machine, determining whether the first virtual machine that satisfies the performance condition is able to be constructed on one of physical machines by referring operation statuses of the physical machines; when the first virtual machine satisfying the performance condition is determined to be unable to be constructed, setting, based on previous determination history of whether second virtual machine that satisfies the performance condition is able to be constructed, a determination period for determining whether the first virtual machine that satisfies the performance condition is able to be constructed, in accordance with time interval at which the second virtual machine that satisfies the performance condition is determined to be able to be constructed; after elapse of a time period corresponding to the determination period, determining whether the first virtual machine is able to be constructed.

12 Claims, 20 Drawing Sheets

(56) References Cited

U.S. PATENT DOCUMENTS

2011/0179417 A1* 7/2011 Inakoshi ............. G06F 9/45558 718/1
2011/0202925 A1* 8/2011 Banerjee ............... G06F 9/5011 718/104
2012/0096460 A1* 4/2012 Sekiguchi ........... G06F 9/45558 718/1
2012/0311153 A1* 12/2012 Morgan .................. H04L 12/00 709/226
2013/0191923 A1* 7/2013 Abuelsaad .............. G06F 21/10 726/26
2014/0019624 A1 1/2014 Kusuta et al.
2014/0047444 A1* 2/2014 Yamaguchi ........... G06F 9/5077 718/1
2014/0258446 A1* 9/2014 Bursell ................. G06F 15/177 709/217
2014/0282520 A1* 9/2014 Sabharwal .............. G06F 9/455 718/1
2015/0040122 A1* 2/2015 Singleton, IV ..... G06F 9/45533 718/1
2015/0309825 A1* 10/2015 Farkas ................ G06F 9/45558 718/1
2015/0317173 A1* 11/2015 Anglin ................ G06F 9/45558 718/1
2016/0162308 A1* 6/2016 Chen ................... G06F 9/45558 718/1
2016/0321455 A1* 11/2016 Deng .................... G06F 21/577

* cited by examiner

| | | NUMBER-OF-TIMES-OF-SAMPLE-SURVEYS (S = EVERY 4 OR 5 HOURS) 131 | | | | NUMBER-OF-OCCURRENCES (N) 132 | AVERAGE-NUMBER-OF-OCCURRENCES ($\nu$ =N/S)) 133 |
|---|---|---|---|---|---|---|---|
| | | 1 | 2 | 3 | 4 | | |
| PERFORMANCE CATEGORY | 1 | 1.1 | 0 | 1.2 | 1.8 | 3 | 0.75 |
| | 2 | 2.0 | 2.9,2.1 | 2.5 | 0 | 4 | 1 |
| | 3 | 3.3 | 3.7,3.3 | 3.9 | 3.4 | 5 | 1.25 |
| | 4 | 4.8 | 0 | 0 | 4.3 | 2 | 0.5 |
| | 5 | 5.2 | 5.8 | 5.8,5.4 | 5.3,5.8 | 6 | 1.5 |

| ACQUISITION REQUEST CONTENT (231) | ACQUISITION REQUEST GENERATION TIME (232) | PERIOD-OF-TIME (233) |
|---|---|---|
| (1,2,3,4,5) | 20150306-15:11:23 | 1 |
| | | 2 |
| ... | | |
| (1,0,1,2,0) | 20150306-20:11:23 | 3 |
| ... | | |

FIG. 6

| | | PROBABILITY OF NUMBER OF VMs PREDICTED TO BE ACQUIRED NEXT TIME | | | |
|---|---|---|---|---|---|
| | | 0 | 1 | 2 | 3 |
| PERFORMANCE CATEGORY | 1 | 0.472367 | 0.354275 | 0.132853 | 0.033213 |
| | 2 | 0.367879 | 0.367879 | 0.183940 | 0.061313 |
| | 3 | 0.286505 | 0.358131 | 0.223832 | 0.093263 |
| | 4 | 0.606531 | 0.303265 | 0.075816 | 0.012636 |
| | 5 | 0.173774 | 0.304104 | 0.266091 | 0.155220 |

FIG. 7

| PROBABILITY OF NUMBER PREDICTED TO BE ACQUIRED NEXT TIME | NUMBER OF VMs PREDICTED TO BE ACQUIRED | PERFORMANCE CATEGORY |
|---|---|---|
| 0.606531 | 0 | 4 |
| 0.472367 | 0 | 1 |
| 0.367879 | 0 | 2 |
| 0.367879 | 1 | 2 |
| 0.358131 | 1 | 3 |
| 0.354275 | 1 | 1 |
| 0.334695 | 1 | 5 |
| 0.303265 | 1 | 4 |

FIG. 8

| PERFORMANCE CATEGORY | CATEGORIZED PERFORMANCE AVERAGE(X) | DEVIATION ($X-\mu$) | SQUARE OF DEVIATION = DISPERSION$(X-\mu)2$ | ($\sigma 2$)AVERAGE VALUE OF DISPERSION | STANDARD DEVIATION($\sigma$) ($\sigma=\sqrt{\sigma 2}$)≒ | DEVIATION VALUE = 50 + DEVIATION + STANDARD DEVIATION | NUMBER OF VMs PREDICTED TO BE ACQUIRED |
|---|---|---|---|---|---|---|---|
| 1 | 1.37 | -2.13 | 4.55 | 2.34 | 2 | 49.40 | 1 |
| 2 | 2.38 | -1.12 | 1.26 | | | 50.41 | 1 |
| 3 | 3.52 | 0.02 | 0.00 | | | 51.55 | 1 |
| 4 | 4.55 | 1.05 | 1.10 | | | 52.58 | 1 |
| 5 | 5.69 | 2.19 | 4.78 | | | 53.72 | 1 |
| TOTAL (5) | 17.51 | | 11.69 | | | | |
| AVERAGE $\mu$ | 3.50 | | | | | | |

FIG. 9

| PERFORMANCE CATEGORY | NUMBER OF VMs PREDICTED TO BE ACQUIRED (E) | DESIRED NUMBER OF VMs (N) |
|---|---|---|
| 1 | 1 | 0 |
| 2 | 1 | 0 |
| 3 | 1 | 0 |
| 4 | 1 | 1 |
| 5 | 1 | 2 |

MULTIDIMENSIONAL VECTORIZATION $$\vec{E} = (1,1,1,1,1)$$

$$\vec{N} = (0,0,0,1,2)$$

COMPUTER READABLE MEDIUM, METHOD, AND MANAGEMENT DEVICE FOR DETERMINING WHETHER A VIRTUAL MACHINE CAN BE CONSTRUCTED WITHIN A TIME PERIOD DETERMINED BASED ON HISTORICAL DATA

CROSS-REFERENCE TO RELATED APPLICATION

This application is based upon and claims the benefit of priority of the prior Japanese Patent Application No. 2015-117753, filed on Jun. 10, 2015, the entire contents of which are incorporated herein by reference.

FIELD

The embodiments discussed herein are related to a computer readable medium, a method, and a management device.

BACKGROUND

In a virtual machine providing system that provides a virtual system realized by physical machines different in performance, a technology for performing addition or the like of a virtual machine in response to a usage status of the virtual system used by a user is known. To add a virtual machine (VM), the user requests the virtual machine providing system to acquire a virtual machine including an expected performance.

As examples of the related art, for example, Japanese Laid-open Patent Publication No. 2012-208580, International Publication Pamphlet No. WO 2012/137272, and Japanese Laid-open Patent Publication No. 2013-190888 are known.

SUMMARY

According to an aspect of the invention, a method includes: performing, by a processor, first determination to determine, in response to receiving an acquisition request, including a performance condition, that requests a first virtual machine, whether the first virtual machine that satisfies the performance condition is able to be constructed on one of physical machines by referring operation statuses of the physical machines; in a case where the first virtual machine that satisfies the performance condition is determined to be unable to be constructed in the first determination, setting, by the processor, based on a previous determination history of whether a second virtual machine that satisfies the performance condition is able to be constructed, a determination period for determining whether the first virtual machine that satisfies the performance condition is able to be constructed, in accordance with a time interval at which the second virtual machine that satisfies the performance condition is determined to be able to be constructed; performing, by the processor, after elapse of a time period corresponding to the determination period, second determination to determine whether the first virtual machine that satisfies the performance condition is able to be constructed; and in a case where the first virtual machine that satisfies the performance condition is determined to be able to be constructed in the second determination, constructing, by the processor, in one of the physical machines, a virtual machine corresponding to the acquisition request for the first virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a sample survey data table according to an embodiment;

FIG. 5 illustrates an example of a sampling period management table according to an embodiment;

FIG. 6 illustrates an example of probabilities of the numbers of VMs predicted to be acquired next time, based on a Poisson distribution, according to an embodiment;

FIG. 7 is a diagram in which the probabilities of the numbers of VMs predicted to be acquired next time in FIG. 6 are sorted in descending order;

FIG. 8 illustrates examples of distributions of performances of VMs predicted to be acquired next time according to an embodiment;

FIG. 9 illustrates an example of multidimensional vectorization of a number predicted to be acquired and a desired number according to an embodiment;

DESCRIPTION OF EMBODIMENTS

In some cases, a usage situation or the like of a physical machine makes it difficult for a user to acquire a virtual machine with a requested performance. Therefore, in a case where it is difficult to acquire a virtual machine with the requested performance, the user delivers, at a predetermined timing, an acquisition request for a virtual machine with the requested performance until being able to acquire a virtual machine with the requested performance.

Figure 1:
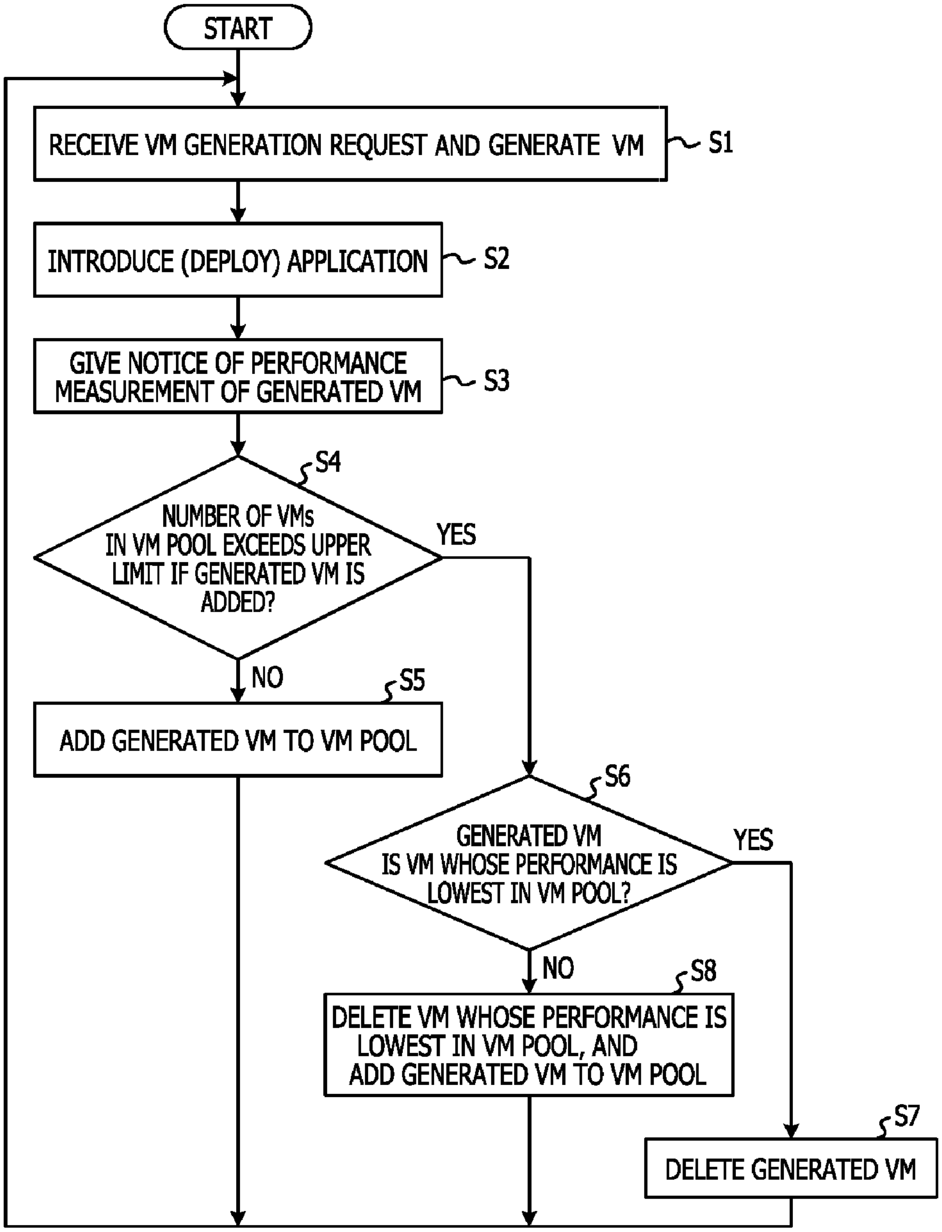
FIG. 1 illustrates an example of VM generation determination processing.

Like an example illustrated in, for example, FIG. 1, in response to a VM acquisition (generation) request from each of users, a virtual machine providing system performs processing for determining whether or not it is possible to provide a virtual machine with a requested performance. In other words, the virtual machine providing system generates a VM for the VM acquisition (generation) request from each of the user (S1), and introduces a predetermined application (S2). Next, the virtual machine providing system measures the performance of the generated VM by using the introduced predetermined application and notifies the corresponding user of a measurement result (S3).

Next, the virtual machine providing system determines whether the number of VMs in a VM pool exceeds a preliminarily defined upper limit value in a case of adding the generated VM to the VM pool (S4). In a case of determining that the number of VMs in the VM pool does not exceed the upper limit value, the virtual machine providing system adds the generated VM to the VM pool (S5). On the other hand, in a case of determining, in S4, that the number of VMs in the VM pool exceeds the upper limit value, the virtual machine providing system determines whether the generated VM is a VM whose performance is the lowest in the VM pool (S6). In a case of being determined as the lowest performance, the generated VM is deleted (S7). On the other hand, in a case of not being determined as the lowest performance in S6, a VM whose performance is the lowest in the VM pool is deleted, and the generated VM is added to the VM pool (S8).

The virtual machine providing system periodically repeats the above-mentioned determination processing until receiving cancellation of the VM acquisition (generation) request. Therefore, whether a virtual machine with a performance requested by one of users is able to be constructed for an acquisition request from the corresponding user is influenced by an acquisition request from another user in some cases.

Therefore, in one aspect of an example, an object of the present technology is to achieve adjustment of a timing for determining whether a virtual machine corresponding to a performance condition requested to be acquired is able to be constructed.

Hereinafter, embodiments of the present technology will be described with reference to accompanying drawings. Note that, in the present specification and drawings, the same symbol will be assigned to a configuration element having substantially the same functional configuration and the redundant description thereof will be omitted.

Entire Configuration of Virtual Machine Providing System

Figure 2:
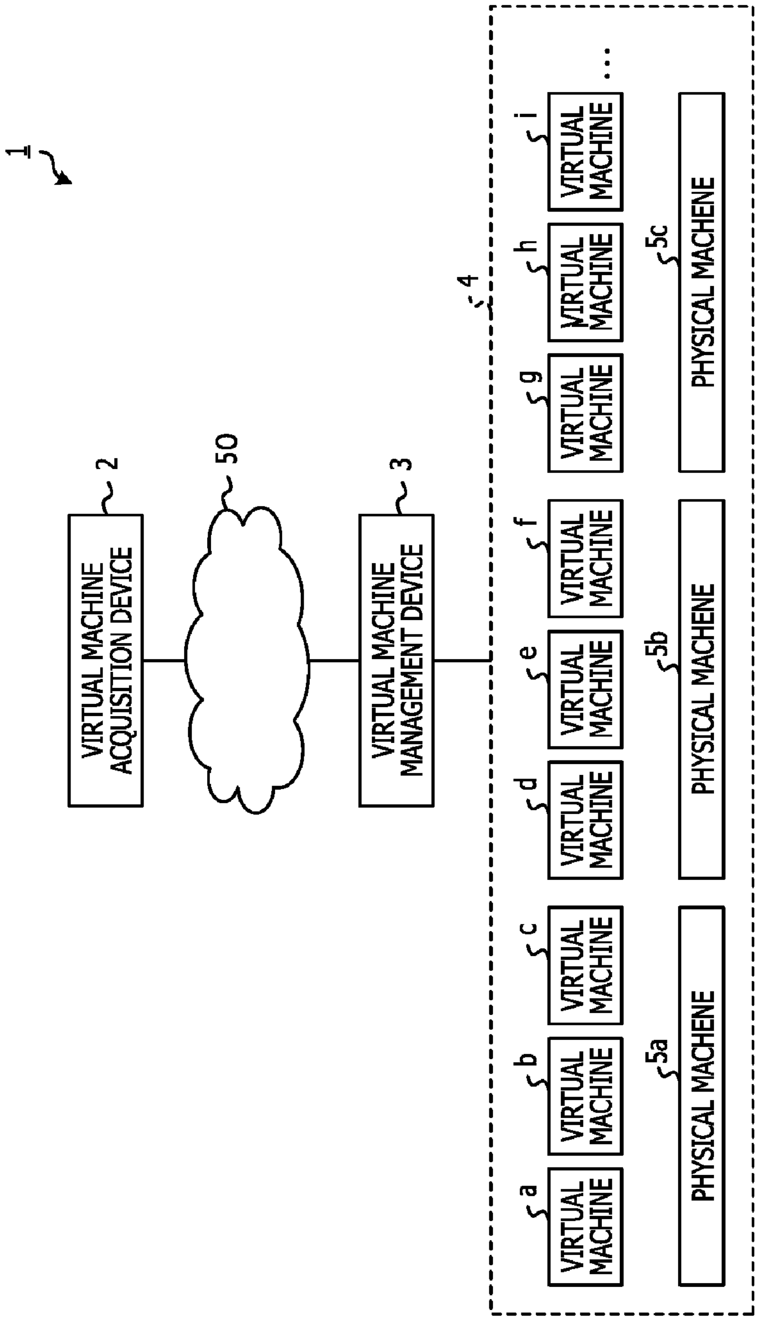
FIG. 2 illustrates an example of an entire configuration of a virtual machine providing system according to an embodiment.

First, an example of an entire configuration of a virtual machine providing system 1 according to an embodiment of the present technology will be described with reference to FIG. 2. The virtual machine providing system 1 according to an embodiment includes a virtual machine acquisition device 2, a virtual machine management device 3, and physical machines 5*a*, 5*b*, 5*c* . . . , that are different in performance, and these devices are connected via a network 50. The physical machines 5*a*, 5*b*, 5*c* . . . are also collectively called physical machines 5. The physical machines 5 are arranged in, for example, a data center 4.

In response to an acquisition request for virtual machines, issued from the virtual machine acquisition device 2, the virtual machine providing system 1 starts virtual machines a to i or the like in a virtual environment configured by the physical machines 5 and provides a usage environment of virtual machines to a user via the network 50. Hereinafter, the usage environment of virtual machines, provided to the user, is also called a "user virtual system". Provision of a service based on the virtual machine providing system 1 is also called a cloud service.

The virtual machine acquisition device 2 may be a user terminal of a user who intends to cause the physical machines 5 managed by the virtual machine management device 3 to start virtual machines and who intends to use, via a network, the virtual machines, and may be a computer installed in a local environment of the user. Alternatively, a virtual machine started on one of the physical machines 5 may be caused to function as the virtual machine acquisition device 2.

The user is able to connect to and use the virtual machine started on the physical machines 5, from the user terminal of the user, such as a personal computer (pc). While here one virtual machine acquisition device 2 is illustrated and described, the virtual machine acquisition devices 2 of users may be connected to the virtual machine providing system 1.

The virtual machine management device 3 is a device that causes the physical machines 5*a*, 5*b*, 5*c* . . . to generate and start virtual machines, in response to an acquisition request for virtual machines, transmitted from the virtual machine acquisition device 2. For example, for each of the physical machines 5, the virtual machine management device 3 stores, in a storage area of the virtual machine management device 3 itself, pieces of information such as sizes of virtual machines started by the corresponding physical machine 5 and the number of virtual machines able to be generated on the corresponding physical machine 5. In addition, the virtual machine management device 3 stores, in a storage area of the virtual machine management device 3 itself, information indicating the number of virtual machines caused to be generated (started) by each of the physical machines 5. With reference to such pieces of information, the virtual machine management device 3 transmits an acquisition request for a virtual machine to one of the physical machines 5 and starts the virtual machine, the corresponding physical machine 5 satisfying a performance condition included in an acquisition request for the virtual machine, transmitted from the virtual machine acquisition device 2, and being able to generate the virtual machine. In addition, the virtual machine management device 3 transmits identification information of the virtual machine caused to be started, to the virtual machine acquisition device 2 that issues the acquisition request for the virtual machine. For example, an Internet protocol (IP) address or the like may be applied to the identification information of the virtual machine.

Each of the physical machines 5 is a computer equipped with a virtualization function of virtualizing computer resources of the computer itself and generating and starting virtual machines. In accordance with a performance condition of a virtual machine, requested to be acquired by the virtual machine acquisition device 2 and transmitted via the virtual machine management device 3, each of the physical machines 5 generates and starts the virtual machine in computer resources of the corresponding physical machine 5 itself.

Here, each of the physical machines 5 virtualizes computer resources of the corresponding physical machine 5 itself in size units corresponding to preliminarily defined performances of virtual machines, classifies the computer resources into performance categories, and starts a virtual machine for each of the classified performance categories. Based on performances such as, for example, a central processing unit (CPU) processing speed, a memory capacity, and a disk capacity, a high-performance virtual machine may be defined as “High (H)”, a middle-performance virtual machine may be defined as “Middle (M)”, and a low-performance virtual machine may be defined as “Low (L)”. Each of the physical machines 5 generates a desired virtual machine whose resources are virtualized in accordance with an acquisition request for a performance condition desired by a user. In addition, in response to an acquisition-stop request for a virtual machine, issued from the virtual machine management device 3, each of the physical machines 5 stops providing the virtual machine started on computer resources of the corresponding physical machine 5 itself.

In this way, each of the physical machines 5 generates and starts a virtual machine with a performance requested to be acquired by a user. At this time, depending on a difference in standard or the like or an operational status of another virtual machine started on the same physical machine 5, some degree of variation is generated in the performances of actually started virtual machines between the physical machines 5.

In other words, performances of resources (CPUs, networks, storages, and so forth) provided by the physical machines 5 within a cloud are uneven. Therefore, depending on a difference in performance of physical resources thereof, an event in which performances at the time of acquiring actual virtual machines (VMs) are different occurs in some cases even if units of virtual resource allocation are equal. In particular, in a field (for example, simulation processing, batch processing, or the like) in which a resource performance allocated to a VM and so forth is desired to be matched with a performance requested by a user, a variation in the performances of actually started VMs becomes an issue in some cases.

Therefore, in order to acquire a VM having a requested performance, in the VM generation determination processing illustrated in FIG. 1, the following processing operations (1) to (3) are periodically repeated. As a result, the acquisition efficiency of a VM having the requested performance is deteriorated.

(1) Generate a VM, (2) Measure and evaluate a VM performance, (2-1) After the performance evaluation, secure the generated VM in a case where the generated VM is a VM having the requested performance, (2-2) After the performance evaluation, delete the generated VM in a case where the generated VM is not a VM having the requested performance, and (3) Delete a VM.

A time interval at which the above-mentioned processing operations (1) to (3) are periodically repeated is also expressed as a “sampling period” hereinafter. The sampling period is an example of a determination period for determining whether a virtual machine satisfying a performance condition subjected to an acquisition request is able to be constructed. For example, in a case of setting the sampling period long, it is often the case that a chance to be able to acquire a VM with a performance requested by a user is missed. As a result, a chance to acquire a VM whose performance takes a processing time is increased, and a processing time taken for implementation exceeds an expected processing time in some cases. On the other hand, in a case of setting the sampling period short, the possibility of being able to acquire a VM with a performance requested by a user is increased. However, a case of performing many sampling operations occurs, and as a result, an extra load on the VM generation determination processing is generated in some cases.

Therefore, in the virtual machine management device 3 according to the present embodiment achieves adjustment of a timing for determining whether a virtual machine is able to be constructed. In other words, the sampling period is adjusted in accordance with a request of a user for the performance of a VM and the performance of a VM able to be actually acquired, thereby optimizing a timing for determining whether a virtual machine with a requested performance is able to be constructed. From this, it is possible to efficiently acquire a VM of a performance condition matched with a request of a user. From this, it is possible to provide a more appropriate VM to the user, and it is possible to suppress a load regarding generation and deletion of VMs.

Functional Configuration of Virtual Machine Management Device

Figure 3:
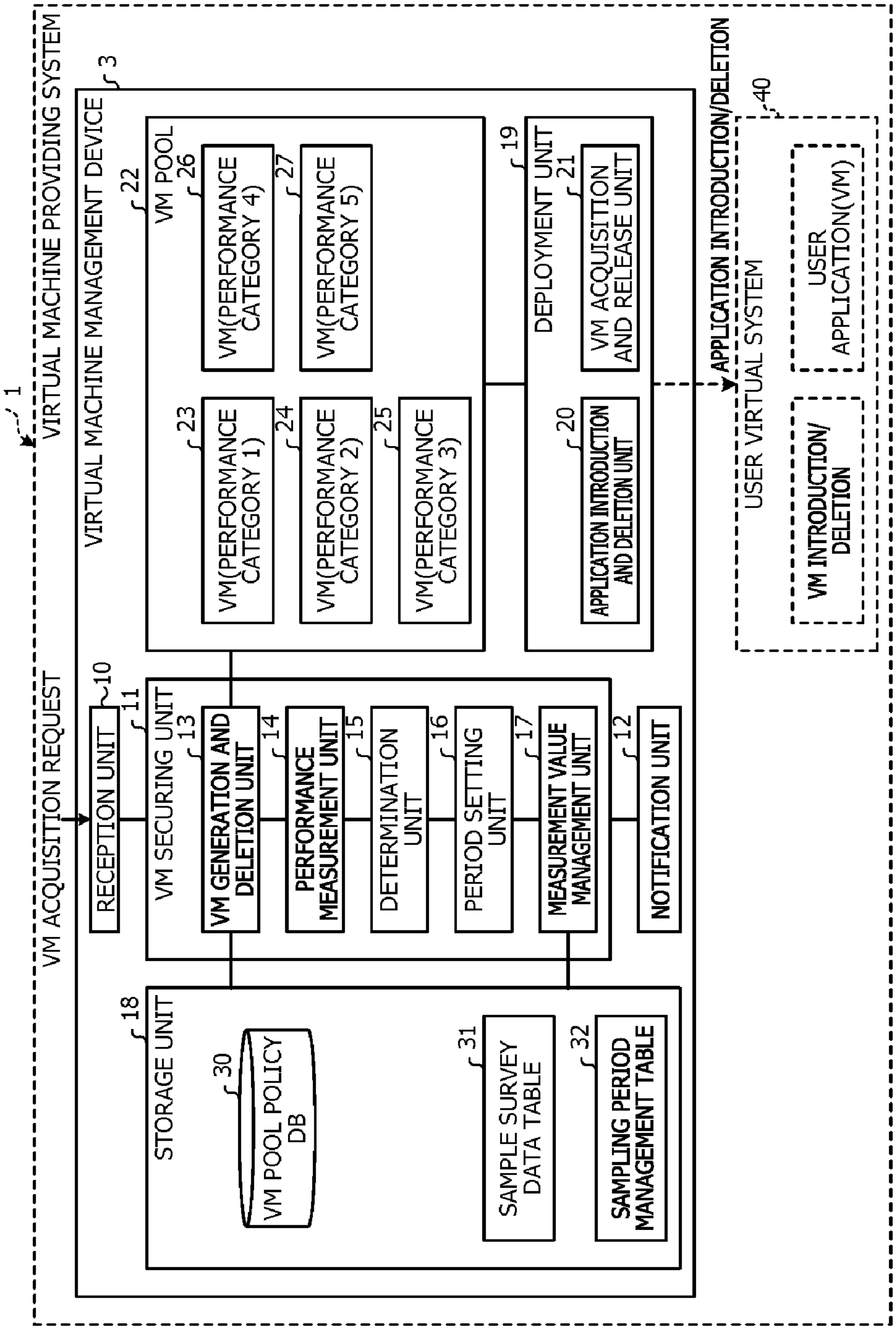
FIG. 3 illustrates an example of a functional configuration of a virtual machine management device according to an embodiment.

Next, an example of a functional configuration of the virtual machine management device 3 will be described with reference to FIG. 3. As illustrated in FIG. 3, the virtual machine management device 3 includes a reception unit 10, a VM securing unit 11, a notification unit 12, a storage unit 18, a deployment unit 19, and a VM pool 22. The reception unit 10 receives an acquisition request for a VM. The acquisition request for a VM includes a performance condition. Based on a result of a sample survey described later, the VM securing unit 11 performs, in an integrated manner, control of securing a high-performance VM. The notification unit 12 notifies a user of a result of generation of a VM performed for the acquisition request.

The VM pool 22 saves therein the high-performance VM secured by the generation of a VM based on the VM securing unit 11. In a case of being deleted or stopped once, a VM is not guaranteed to be able to secure a performance at a restart, and therefore, the VM is stored in the VM pool 22.

The deployment unit 19 introduces a desired application into a VM and causes the application to be available by the VM. The deployment unit 19 includes an application introduction and deletion unit 20 and a VM acquisition and release unit 21. The application introduction and deletion unit 20 installs a specified application into a VM having a specified VM identifier. In addition, the application introduction and deletion unit 20 uninstalls an application from an undesired VM. The VM acquisition and release unit 21 acquires, from the VM pool 22, a VM corresponding to an installed application and returns, to the VM pool 22, a VM corresponding to an uninstalled application. In a case where, as a result of generation of a VM, a VM with a requested performance is obtained, the VM securing unit 11 stores the generated VM in the VM pool 22.

The storage unit 18 includes a VM pool policy DB 30, a sample survey data table 31, and a sampling period management table 32.

The VM pool policy DB 30 holds a correction policy of performance categories and pieces of correction policy definition information such as a collection interval of data and a time period, obtained by performance measurement (hereinafter, also called a “sample survey”).

The storage unit 18 holds, in the sample survey data table 31, sample survey data obtained as a result of a sample survey of VM performances within the same cloud computer. An example of the sample survey data table 31 is illustrated in FIG. 4. A range from the lowest value (1) of a performance to the highest value (10) thereof is divided into, for example, 5 equals part, and a number-of-times-of-sample-surveys 131, a number-of-occurrences 132, and an average-number-of-occurrences 133, which correspond to each of categories of performance categories 1 to 5 in which the corresponding 2 values correspond to the corresponding one of the categories, are recorded in the sample survey data table 31. Note that while here the performance categories are set in 5 stages, the number of the performance categories is not limited to this. In addition, the number of the performance categories may be set by a user. In the present embodiment, the sample survey is performed every S time period (=4 or 5 hours), the number of generated VMs in each of the performance categories is counted, and sample survey data corresponding to an entire time period is stored. In the present embodiment, sampling in a given period of time is performed. 1 interval (the sampling period) may be defined as, for example, 3 hours, and sampling corresponding to 1 week may be performed. In a case where the number of VMs generated at once is small (for example, 1), generation and deletion of VMs are performed 5 times every 5 minutes at hourly intervals, and sample survey data obtained by performing a sample survey therefor may be defined as 1 piece of sampling data.

In the example of FIG. 4, the number of VMs generated every S time period is recorded. In the sample survey of, for example, the performance category 1, regarding the number-of-times-of-sample-surveys 131, a benchmark value of the number of VMs for the first time is "1.1", a benchmark value of the number of VMs for the second time is "0", a benchmark value of the number of VMs for the third time is "1.2", a benchmark value of the number of VMs for the fourth time is "1.8", and the number-of-occurrences (N) 132 is 3. As a result, the average-number-of-occurrences 133 becomes 0.75 (=3/4).

In addition, in the sample survey of the performance category 2, regarding the number-of-times-of-sample-surveys 131, a benchmark value of the number of VMs for the first time is "2.0", benchmark values of the number of VMs for the second time are "2.9" and "2.1", a benchmark value of the number of VMs for the third time is "2.5", a benchmark value of the number of VMs for the fourth time is "0", and the number-of-occurrences (N) 132 is 4. As a result, the average-number-of-occurrences (v) 133 becomes 1 (=4/4).

In the sampling period management table 32 whose example is illustrated in FIG. 5, the storage unit 18 stores an acquisition request content 231, an acquisition request generation time 232, and a period-of-time 233. In a case where the acquisition request content 231 of an acquisition request from a user is, for example, (1, 2, 3, 4, 5), the acquisition request content 231 requests 1 VM in the performance category 1, 2 VMs in the performance category 2, 3 VMs in the performance category 3, 4 VMs in the performance category 4, and 5 VMs in the performance category 5. The acquisition request generation time 232 indicates a time when the acquisition request content 231 is requested, and the period-of-time 233 indicates a period with which the acquisition request content 231 is requested.

The VM securing unit 11 includes a VM generation and deletion unit 13, a performance measurement unit 14, a determination unit 15, a period setting unit 16, and a measurement value management unit 17. The VM generation and deletion unit 13 generates and deletes VMs, based a performance condition subjected to an acquisition request. In addition, the VM generation and deletion unit 13 generates and deletes VMs, based an instruction of a function of predicting a performance and a number, which are to be acquired next time.

The performance measurement unit 14 calculates the number of VMs predicted to be acquired next time, an entire performance, and so forth, based on sample survey data.

Based on a calculation result of the performance measurement unit 14, the determination unit 15 determines whether a VM that satisfies a performance condition requested to be acquired by a user is able to be constructed by one of the physical machines 5.

Based on a determination result of the determination unit 15, the period setting unit 16 controls a setting of the sampling period indicating a sample survey period interval, securing of acquisition of a VM, and so forth.

The measurement value management unit 17 stores and manages pieces of information or the like, related to a result of the sample survey and VMs secured in the VM pool 22.

Adjustment of Sampling Period

Next, adjustment of a sampling period according to an embodiment will be described with reference to FIG. 6 to FIG. 9. Based on the sample survey data stored in the sample survey data table 31, the period setting unit 16 calculates the probability mass of each of the performance categories by using a Poisson distribution f(x) illustrated in, for example, the following Poisson distribution Expression (1).

$$f(x) = \frac{v^x e^{-v}}{x!} \tag{1}$$

Here, "x" is a benchmark value of a previous sample survey result stored in the sample survey data table 31, and "v" is the average number of occurrences. In the generation of VMs illustrated in the sample survey data table 31 illustrated in FIG. 4, individual VMs are generated 4 times to 6 times every 5 hours. Here, the time interval of acquisition of VMs and the number of times thereof are set so as to be able to collect the VM performance distribution of an entire data center as accurately as possible. The time interval of acquisition of VMs and the number of times thereof are set to, for example, 1 month and 30 times every day or 3 times per day, such as every morning, noon, and night in 1 day.

The collected sample survey data is sent to the performance measurement unit 14 and is stored in the sample survey data table 31 as illustrated in FIG. 4. If the collection of the sample survey data finishes, a range between a minimum value and a maximum value of the sample survey data is divided into 5 equal parts, and the sample survey data is categorized into pieces of data of the performance categories 1 to 5. Here, the number of the performance categories is defined in accordance with the exactness of calculation of a desired performance. In a case of obtaining a more exact performance, the sample survey data is more finely divided into equal parts, thereby increasing the number of performance categories. In addition, in a case of obtaining a less exact performance, the sample survey data is more roughly divided into equal parts, thereby decreasing the number of performance categories.

The performance measurement unit 14 obtains the number of times of occurrences (N) of each of the performance categories illustrated in FIG. 4 and obtains the average number of occurrences (v: v=N/S) within the number of times of the sample survey. Based on the obtained average number of occurrences (v), the performance measurement unit 14 predicts next performance evaluation from previous sample survey results, by using the Poisson distribution Expression (1). As a result, like an example illustrated in, for example, FIG. 6, the performance measurement unit 14 calculates the probability of the predicted number of VMs predicted to be acquired next time. The probability that no VM in the performance category 1 is able to be acquired next time is calculated as, for example, "0.472367". In addition, the probability that 1 VM in the performance category 1 is able to be acquired next time is calculated as "0.354275", the probability that 2 VMs in the performance category 1 are able to be acquired next time is calculated as "0.132853", and the probability that 3 VMs in the performance category 1 are able to be acquired next time is calculated as "0.033213".

Next, the performance measurement unit 14 sorts, in descending order, the obtained probabilities of the numbers of VMs predicted to be acquired next time. A result of sorting, in descending order, the probabilities of the numbers of VMs predicted to be acquired next time is illustrated in FIG. 7. The performance measurement unit 14 obtains a set in which the sum of the numbers of VMs predicted to be acquired next time corresponds to the number of samples=5 beginning from the top of the probability. In a case of FIG. 7, the set in which the sum of the numbers of VMs predicted to be acquired next time corresponds to the number of samples=5 is (0.367879, 0.358131, 0.354275, 0.334695, 0.303265).

Next, the performance measurement unit 14 surveys a position in an entire performance, at which the set in which the sum of the numbers of VMs predicted to be acquired next time corresponds to the number of samples=5 is located, and after acquiring a VM, the performance measurement unit 14 determines whether to secure in the VM pool 22 or to perform only collection of the sample survey data. In addition, the period setting unit 16 determines whether to correct the sampling period.

Specifically, the performance measurement unit 14 quantifies the performance distribution of VMs whose number is predicted to be acquired next time. As illustrated in FIG. 8, first the performance measurement unit 14 calculates the average value (X) of each of the performance categories of the obtained sample survey data. The average value is calculated based on Σ sample values/the number of occurrences. The average value (X) of the categorized performance of, for example, the performance category 1 is (1.1+1.2+1.8)/3=1.37.

Next, from the obtained average values of categorized performances, the performance measurement unit 14 obtains a standard deviation value (σ) for each of the performance categories. In order to obtain the standard deviation value (σ), first the performance measurement unit 14 calculates a dispersion of each of the performance categories. The dispersion is a value obtained by squaring a deviation, (X−μ). "μ" is the average value, 3.50 (=17.50/5), of the average values (X) of the categorized performances of the performance categories 1 to 5.

The performance measurement unit 14 calculates the average value, 2.34 (=11.7/5) of the dispersions. Next, the performance measurement unit 14 calculates the standard deviation value from the average value of the dispersions. From the average value of the dispersions, the standard deviation value ($\sigma=\sqrt{\sigma^2}$) is calculated as "2".

Next, based on the standard deviation value, the performance measurement unit 14 calculates a deviation value of each of the performance categories. The deviation value of each of the performance categories is calculated from 50+the deviation, (X−μ), of the corresponding performance category+the standard deviation value (σ). The deviation value of each of the performance categories is an index of the possibility of acquiring the number of VMs predicted to be acquired next time for the corresponding performance category. Based on the level of the deviation value of each of the performance categories, the determination unit 15 determines whether VMs whose number is predicted to be acquired next time is able to be acquired.

By using the inner product of a number predicted to be acquired next time and a number requested to be acquired next time, the performance measurement unit 14 performs high-dimensional vectorization. The performance measurement unit 14 multidimensionally vectorizes and expresses, for example, the numbers of VMs predicted to be acquired next time (E), illustrated in FIG. 9, and the numbers of VMs requested to be acquired (N) by a user, stored in the sampling period management table 32. Here, based on E=(1,1,1,1,1) and N=(0,0,0,1,2), the performance measurement unit 14 calculates the inner product of Expression (2).

$$\vec{E}\cdot\vec{N}=(1,1,1,1,1)(0,0,0,1,2) \tag{2}$$

Note that a number predicted to be acquired for each of the performance categories, obtained by taking into consideration the deviation value described above, is an example of a previous determination history of whether a virtual machine that satisfies a performance condition is able to be constructed.

Sampling Period

Next, based on Expression (3), the period setting unit 16 calculates the degree of similarity to the multidimensional vector. The degree of similarity has a value greater than or equal to "0" and less than or equal to "1".

$$\text{degree of similarity} = sim(E,N) = \cos\theta = \frac{\vec{E}\cdot\vec{N}}{|\vec{E}||\vec{N}|} \tag{3}$$

$$0 \leqq sim(E,N) \leqq 1$$

Base on Expression (4), the period setting unit 16 calculates a sampling period T.

$$\text{sampling period } T=(\text{adjustment value } M+(1-\text{sim}(E,N))\times\text{standard sampling period} \tag{4}$$

Here, an adjustment value M is an initial sampling period and is preliminarily set. The adjustment value M may be, for example, 0 hours and may be 1 hour. In the present embodiment, the adjustment value M is set to 0.8 hours. Here, a standard sampling period is set to 1 hour. In a case where the degree of similarity (sim(E,N)) is calculated as "0.2", the period setting unit 16 calculates the next sampling period T as 1.6 hours (=0.8+(1−0.2))×1).

Figure 10:
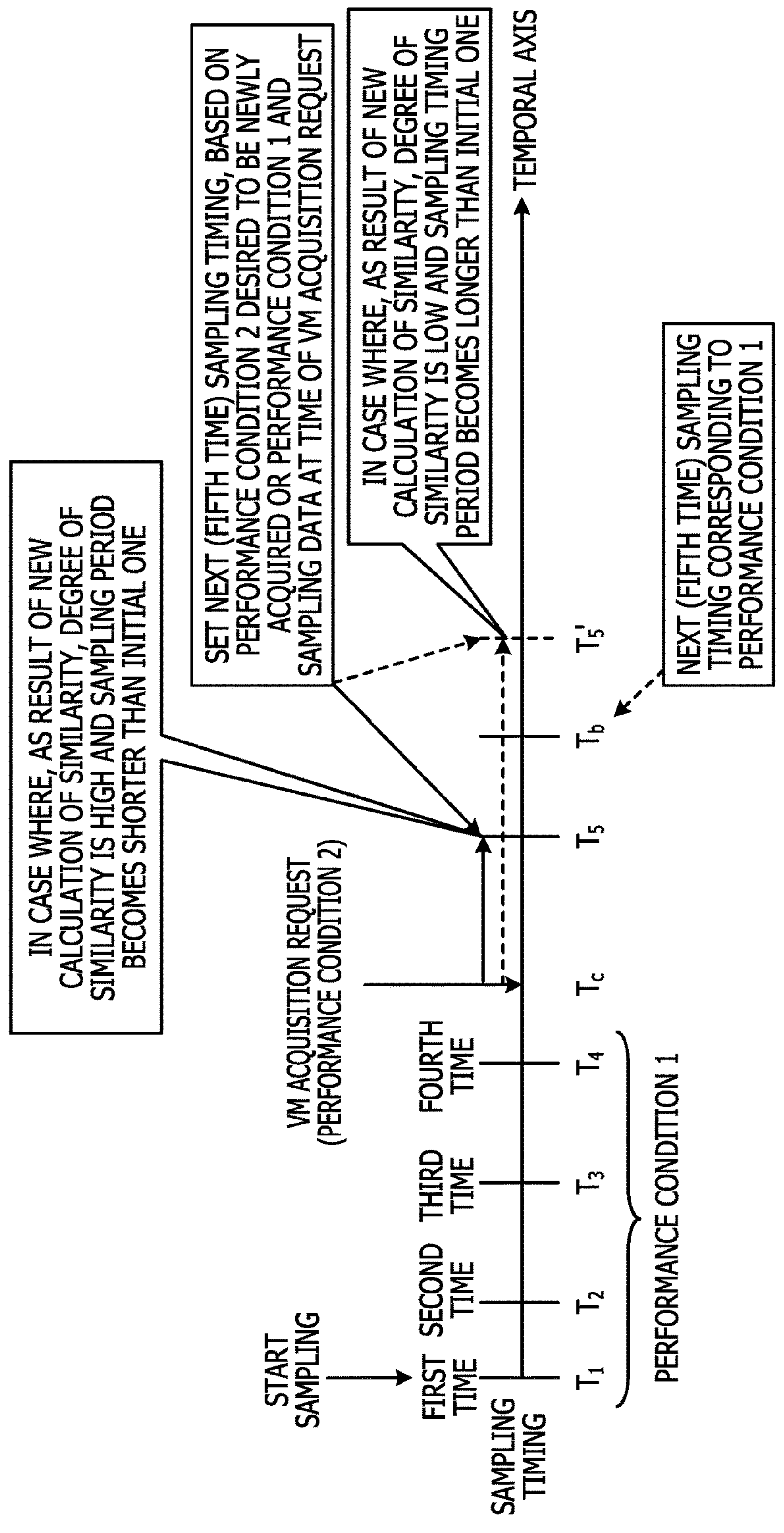
FIG. 10 is a diagram for explaining adjustment of a sampling period according to an embodiment.

Based on Expression (4), the next sampling period T decreases with an increase in the degree of similarity and increases with a decrease in the degree of similarity. Adjustment of the sampling period according to the present embodiment will be described with reference to FIG. 10. As a horizontal axis, a temporal axis is illustrated, and times (sampling timings) $T_1$, $T_2$, $T_3$, $T_4$ . . . of sampling, based on the sampling period, are clearly specified. In the example of FIG. 10, first, at the time $T_1$ based on the standard sampling period, sampling for acquiring a VM for the first time is performed based on a performance condition 1 requested by a user. Next, at the time $T_2$ to time $T_4$ based on the standard sampling period, sampling for acquiring VMs for the second time to the fourth time is performed based on the performance condition 1.

There will be considered a case where a performance condition intended to be acquired by the user changes before sampling for acquiring a VM for the fifth time, based on the performance condition 1, is performed, and a new VM acquisition request for requesting a performance condition 2 is delivered. In this case, the adjustment of the sampling period is achieved on a scheduled sampling time $T_b$ for acquiring a VM for the fifth time, based on the standard sampling period.

In other words, in response to it that the new VM acquisition request for the performance condition 2 is received before the predicted next sampling period $T_b$ expires, the VM securing unit 11 performs sampling at a time $T_c$ without waiting for the next sampling period. As a result, the VM securing unit 11 holds, in the VM pool 22, a VM, whose performance meets the VM acquisition request for the performance condition 2 or is close to the performance condition 2, and allocates, from sampled and acquired VMs, a VM with a performance requested by the user.

In accordance with the VM acquisition request for the performance condition 2, the period setting unit 16 calculates a next sampling period based on the performance condition 2 of the new acquisition request. If "the performance condition 2 of a new acquisition request" is not presented at the time of an acquisition request for a VM, the period setting unit 16 calculates and sets new next and succeeding sampling periods, based on the "performance condition 1" and the above-mentioned sampling result.

If the similarity value calculated at the time of obtaining the sampling period is greater than or equal to a preliminarily defined threshold value H (for example, 0.7), the VM generation and deletion unit 13 acquires a VM whose performance is high among acquired VMs. If acquisition of the number of VMs requested by the user is not reached at this time, next sampling is performed in accordance with a sampling period $T_5$ shorter than the previous one and calculated based on Expression (4). From this, it is possible to increase the possibility of acquiring a high-performance VM at the time of acquiring a VM next time.

In addition, if the similarity value lies between the threshold value H (for example, 0.7) and a threshold value L (for example, 0.4), the sampling period T remains the period $T_b$, based on Expression (4). In addition, in a case where the similarity value is less than or equal to the threshold value L (for example, 0.4), if acquisition of the number of VMs requested by the user is not reached, next sampling is performed in accordance with a sampling period $T_5'$ longer than the previous one and calculated based on Expression (4). From this, it is possible to adjust the sampling period.

As described above, according to the present embodiment, based on a result of determination of whether a VM is able to be constructed and the degree of similarity thereof, it is possible to achieve adjustment of a subsequent sampling period. In a case where the number of VMs used for, for example, the sample survey (performance measurement) is small (such as, for example, a case where there is a restriction in a physical memory amount able to be used at one time), the standard sampling period is temporarily set short (for example: 5 minutes) and the number of samples at one time is increased. If a given period of time (for example, 10 times every 2 hours) of the sample survey finishes, a subsequent sampling period (for example, 2 hours later) is predicted based on the sampling period, or alternatively, the performances of VMs able to be secured in scheduled utilization times of secured VMs and the number thereof are predicted by using a Poisson distribution or the like. As a result, in a case where the predicted VMs able to be secured do not satisfy performance conditions, the sampling period is set long. From this, the sampling is adjusted from, for example, a sampling period of being performed 10 times every 2 hours to a sampling period of being performed 10 times every 4 hours.

In a case where the predicted VMs able to be secured satisfy performance conditions, the sampling period is set short, thereby increasing the probability of acquiring VMs whose performances satisfy a request. In addition, in a case where the actually expected number of VMs is not satisfied and a higher-performance VM is able to be expected to be acquired, the sampling period is set shorter, thereby further increasing the probability of acquiring VMs with expected performances.

Note that in a case where, during collection of the sample survey data, an outstanding benchmark value (a value described for each of times the sample survey is performed in FIG. 4) is measured, the number of the performance categories may be corrected. In a case where the benchmark value lies between, for example, 1 to 5, if a new high-performance physical machine or the like is deployed, thereby measuring "10" as the benchmark value, the number of the performance categories may be extended from 5 categories to 10 categories. In this regard, however, the number of the performance categories may be caused to remain 5 categories. This correction policy is defined in the VM pool policy DB 30, and the number of the performance categories is adjusted based on the defined correction policy. In addition, while, in the present embodiment, VM securing and performance evaluation processing corresponding to a VM acquisition request of one user will be described, it is possible to meet VM securing and performance evaluation processing corresponding to VM acquisition requests of users (tenants).

VM Securing and Performance Evaluation Processing

Figure 11A:
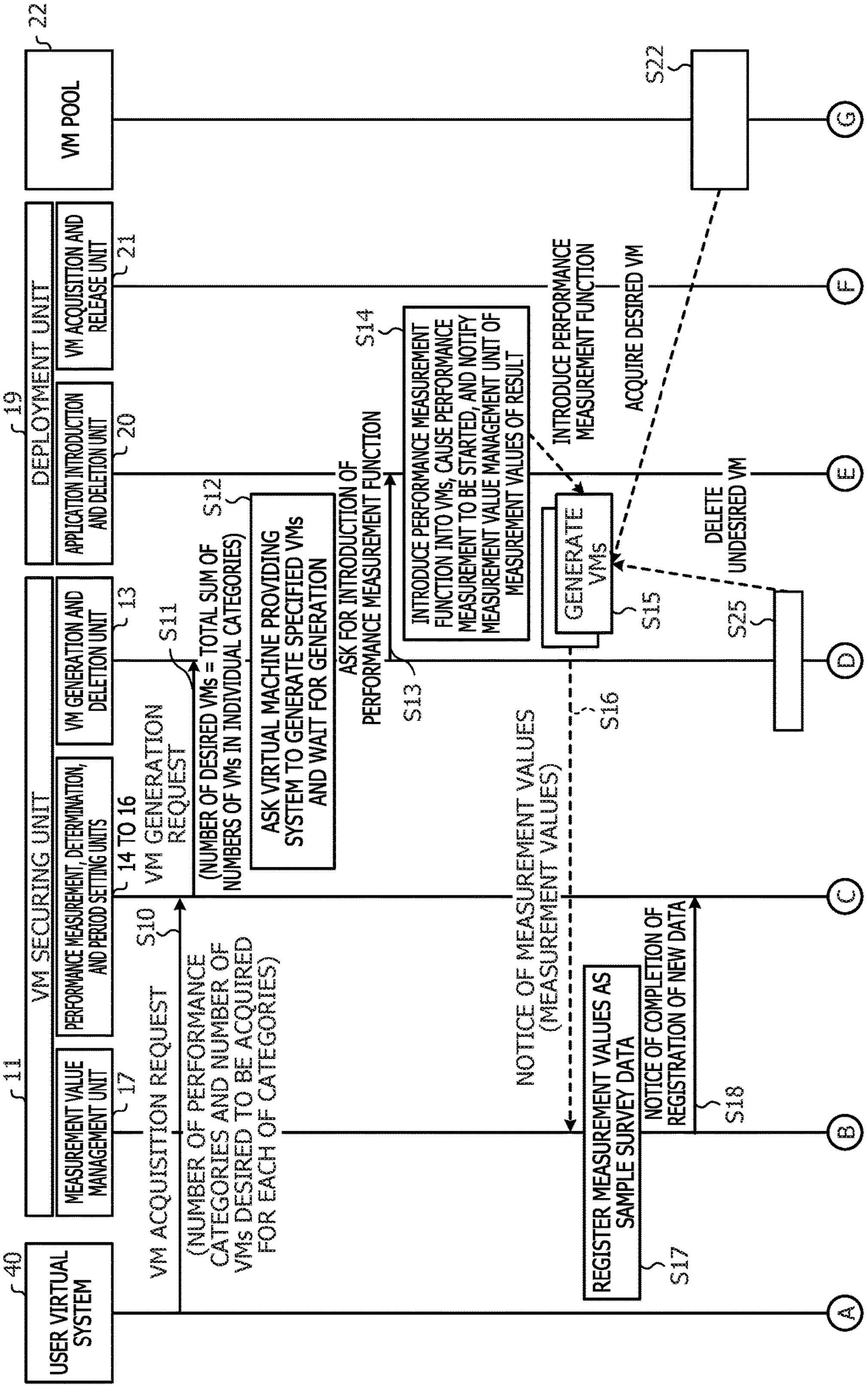
FIGS. 11A and 11B are sequence diagrams illustrating an example of VM securing and performance evaluation processing according to an embodiment.
Figure 11B:
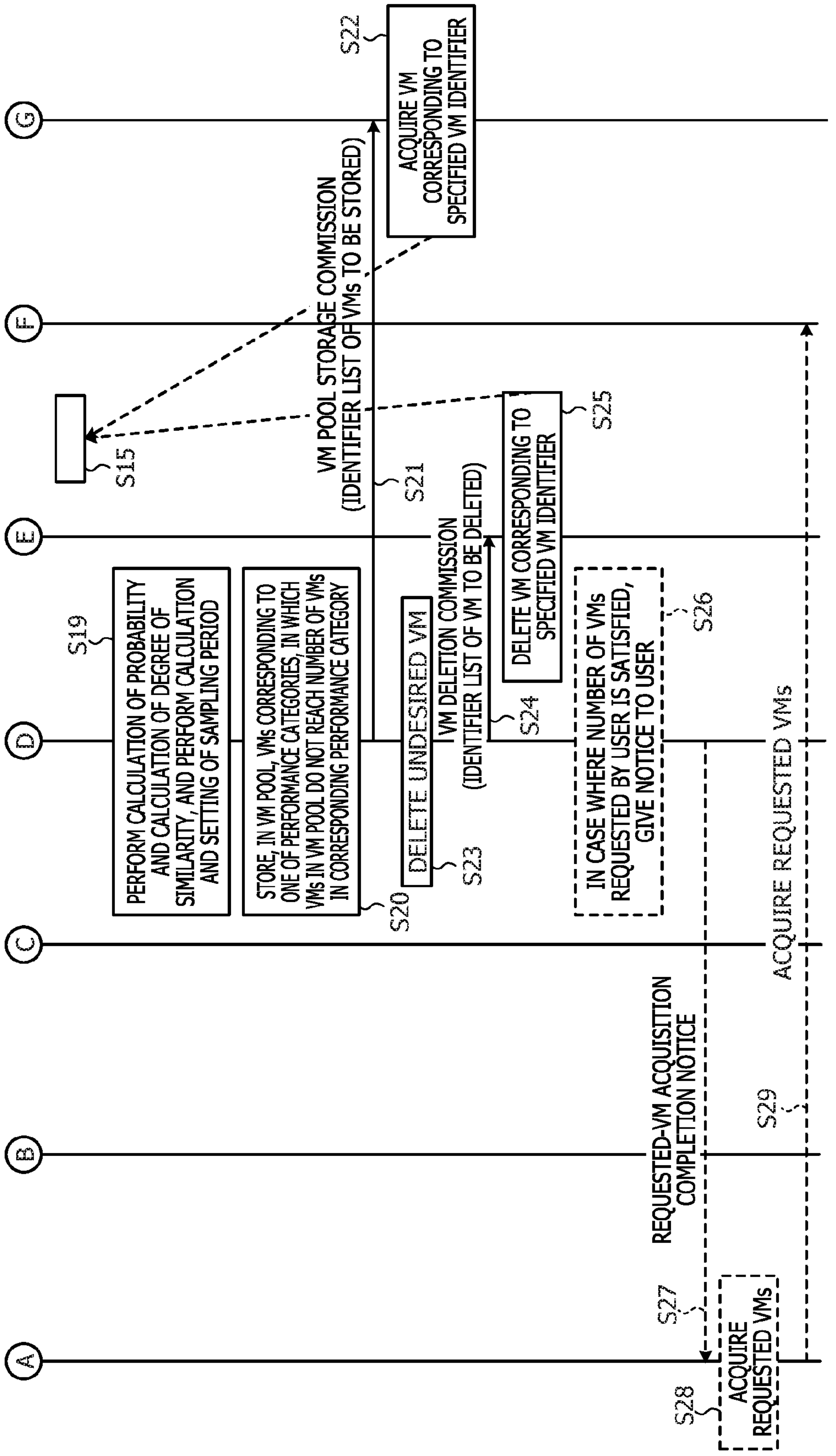

Next, an example of the VM securing and performance evaluation processing according to the present embodiment will be described with reference to FIGS. 11 to 15. First, as illustrated in FIG. 11A and FIG. 11B, a VM acquisition request is delivered from a user virtual system 40 (S10). The VM acquisition request includes pieces of information of the number of performance categories and the number of VMs requested to be acquired for each of the categories. The number of performance categories and the number of VMs requested to be acquired for each of the categories are examples of performance conditions of the VM acquisition request.

A VM generation request corresponding to the VM acquisition request is delivered to the VM generation and deletion unit 13 (S10). The VM generation request includes information (an example of the performance condition 1) of the number of desired VMs, in other words, the total sum of the numbers of VMs in the individual categories. The VM generation and deletion unit 13 asks the virtual machine providing system 1 (a cloud service) to generate VMs whose number is specified (S11) and waits for generation of the VMs (S12).

The VM generation and deletion unit 13 asks the deployment unit 19 to introduce a performance measurement function (S13). The application introduction and deletion unit 20 introduces the performance measurement function into the VMs (S14). If the virtual machine providing system 1 generates the VMs (S15), the application introduction and deletion unit 20 causes a VM in each of the performance categories to start performance measurement and notifies the measurement value management unit 17 of measurement values (benchmark values) of a measurement result (S14 to S16). The measurement value management unit 17 registers, in the sample survey data table 31, the measurement values as sample survey data (S17) and gives notice of completion of registration of the new sample survey data (S18).

The performance measurement unit 14 calculates the probability of a number predicted to be acquired next time and calculates the degree of similarity, and the period setting unit 16 calculates a sampling period and sets a new sampling period (S19). In addition, in a case of determining that VMs in the VM pool 22 does not reach the number of VMs in one of the individual performance categories, the determination unit 15 causes VMs corresponding to the corresponding performance category to be stored in the VM pool 22 (S20). The determination unit 15 delivers, to the VM pool 22, a commission to store VMs in the VM pool 22 (S21). The commission to store VMs includes a VM identifier list for identifying VMs to be stored. The VM pool 22 acquires a VM corresponding to a specified VM identifier from among the generated VMs (S22).

In addition, the determination unit 15 delivers a request to delete an undesired VM (S23) and asks the VM generation and deletion unit 13 (S24). The request to delete a VM includes a list of an identifier for identifying a VM to be deleted. The VM generation and deletion unit 13 deletes a VM corresponding to a specified VM identifier (S25). In a case of determining that the number of VMs requested to be acquired by a user (the performance condition 1) is satisfied, the determination unit 15 notifies the user to that effect (S26). In response to this, a notice informing that acquisition of requested VMs is completed is transmitted to the user virtual system 40 (S27). Upon receiving this notice, the user virtual system 40 acquires the requested VMs (S28) and asks the VM acquisition and release unit to acquire the requested VMs (S29).

Figure 12:
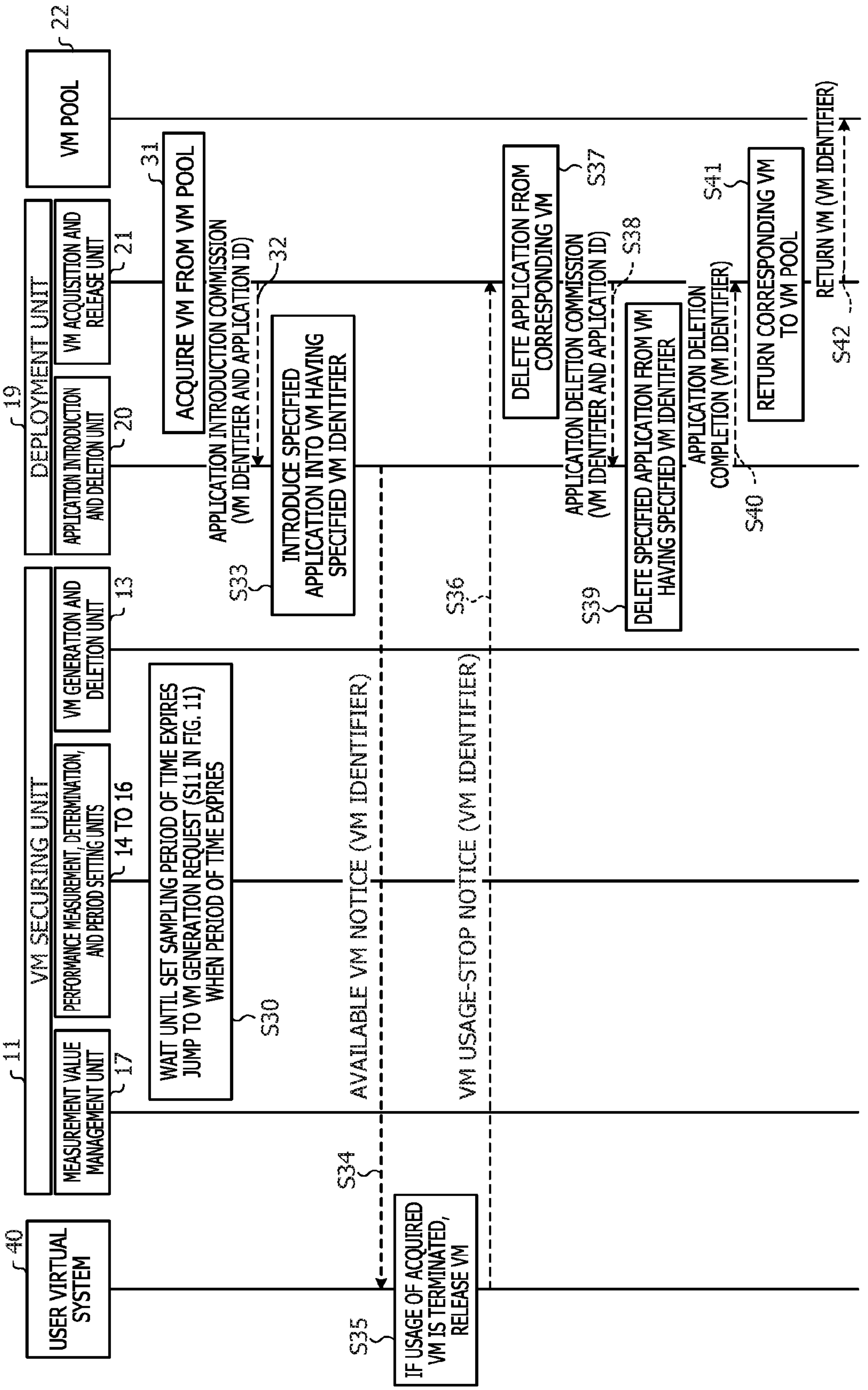
FIG. 12 is a sequence diagram illustrating an example of the VM securing and performance evaluation processing according to an embodiment.

Next, as illustrated in FIG. 12, the period setting unit 16 waits until a time period corresponding to a set sampling period expires, and the period setting unit 16 jumps, at the time of expiration of that time period, to S11 in FIG. 11A (S30), thereby causing VM generation request processing and subsequent processing to be performed.

The VM acquisition and release unit 21 acquires a VM from the VM pool 22 (S31) and delivers an application introduction commission (S32). The application introduction commission includes an acquired VM identifier and the ID of an application to be introduced. The application introduction and deletion unit 20 introduces the specified application into the VM having the specified VM identifier (S33). The application introduction and deletion unit 20 notifies that the introduction of the application into the specified VM is completed and the VM becomes available (S34). The present notice includes information of the VM identifier.

Upon receiving the available VM notice, the user virtual system 40 initiates the usage of the VM, and if terminating the usage of the acquired VM, the user virtual system 40 releases the VM (S35). From this, a VM usage-stop notice is delivered to the VM acquisition and release unit 21 (S36). The VM usage-stop notice includes information of the VM identifier of the VM to be released. The VM acquisition and release unit 21 deletes the application from the VM identified by the VM identifier (S37). From this, an application deletion commission is delivered to the application introduction and deletion unit 20 (S38). The application deletion commission includes the identifier of the acquired VM and the ID of the introduced application. The application introduction and deletion unit 20 deletes the specified application from the VM having the specified VM identifier (S39). The application introduction and deletion unit 20 delivers a deletion completion notice of the application (S40). The deletion completion notice of the application includes the deleted VM identifier.

The VM acquisition and release unit 21 returns the corresponding VM to the VM pool 22 (S41). The VM identified by the VM identifier is returned to the VM pool 22 (S42).

As above, the VM securing and performance evaluation processing, performed at a time corresponding to the sampling period, is described. Next, VM securing and performance evaluation processing and sampling period determination processing in a case where a VM acquisition request is issued before the sampling period comes will be described with reference to FIG. 13A to FIG. 16.

Figure 13A:
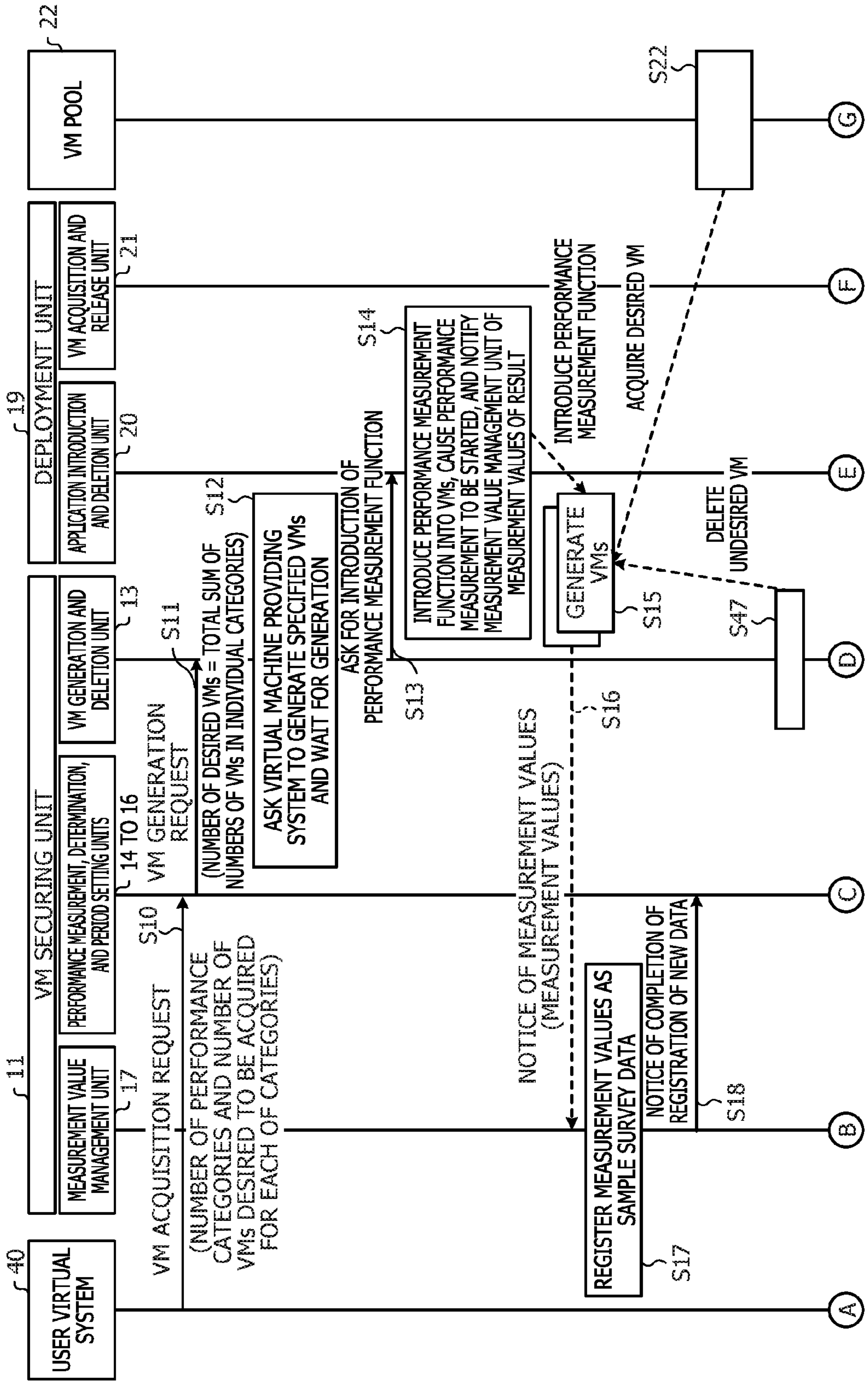
FIGS. 13A and 13B are sequence diagrams illustrating an example of VM securing and performance evaluation processing according to an embodiment.
Figure 13B:
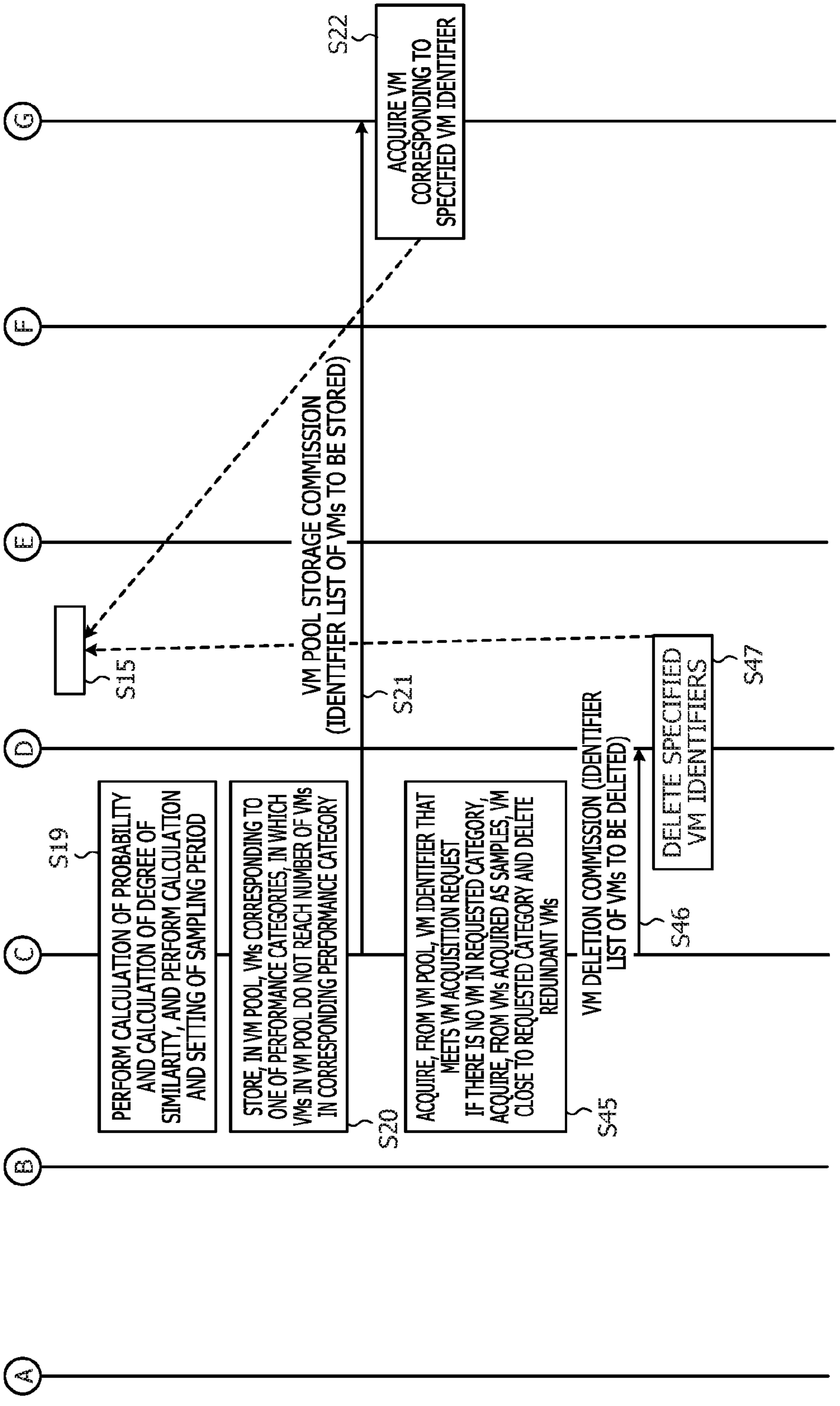

Since S10 to S22 in FIG. 13A and FIG. 13B are the same as S10 to S22 in FIG. 11A, here the descriptions thereof will be omitted, and explanations will be made beginning from S45. The determination unit 15 acquires, from the VM pool 22, a VM identifier that meets a VM acquisition request, and if it is determined that there is no VM in a requested performance category, the determination unit 15 acquires, from VMs acquired as samples, a VM close to the requested performance category and deletes VMs other than that (S45). Next, the determination unit 15 asks for a deletion request for undesired VMs (S46). The deletion request for the VMs includes a list of VM identifiers to be deleted. The VM generation and deletion unit 13 deletes VMs corresponding to the specified VM identifiers (S47).

Figure 14:
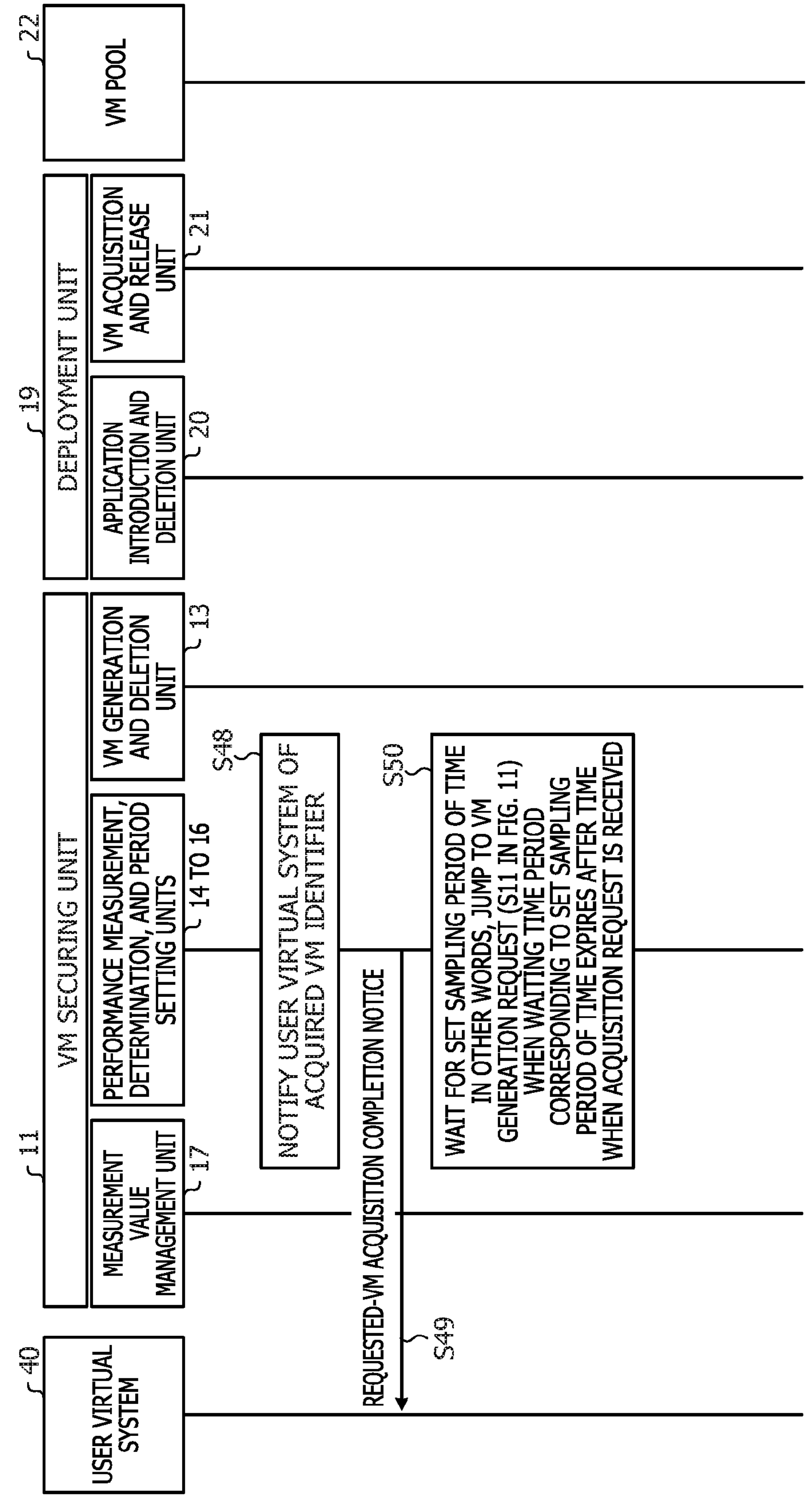
FIG. 14 is a flowchart illustrating an example of the VM securing and performance evaluation processing according to an embodiment.

Next, transferring to FIG. 14, the determination unit 15 notifies the user virtual system 40 of the acquired VM identifier (S48). In response to this, a notice informing that acquisition of the requested VM is completed is transmitted to the user virtual system 40 (S49). The period setting unit 16 waits for the set sampling period of time. In other words, the period setting unit 16 is put into a waiting state during an optimized sampling period of time (for example, $T_5$ or $T_5'$ in FIG. 10) calculated in accordance with the degree of similarity, after a time when the VM acquisition request is received. In a case where the sampling timing corresponding to the sampling period of time comes, the processing jumps to S11 in FIG. 13A, and the VM generation request processing is started (S50).

Sampling Period Determination Processing

Figure 15A:
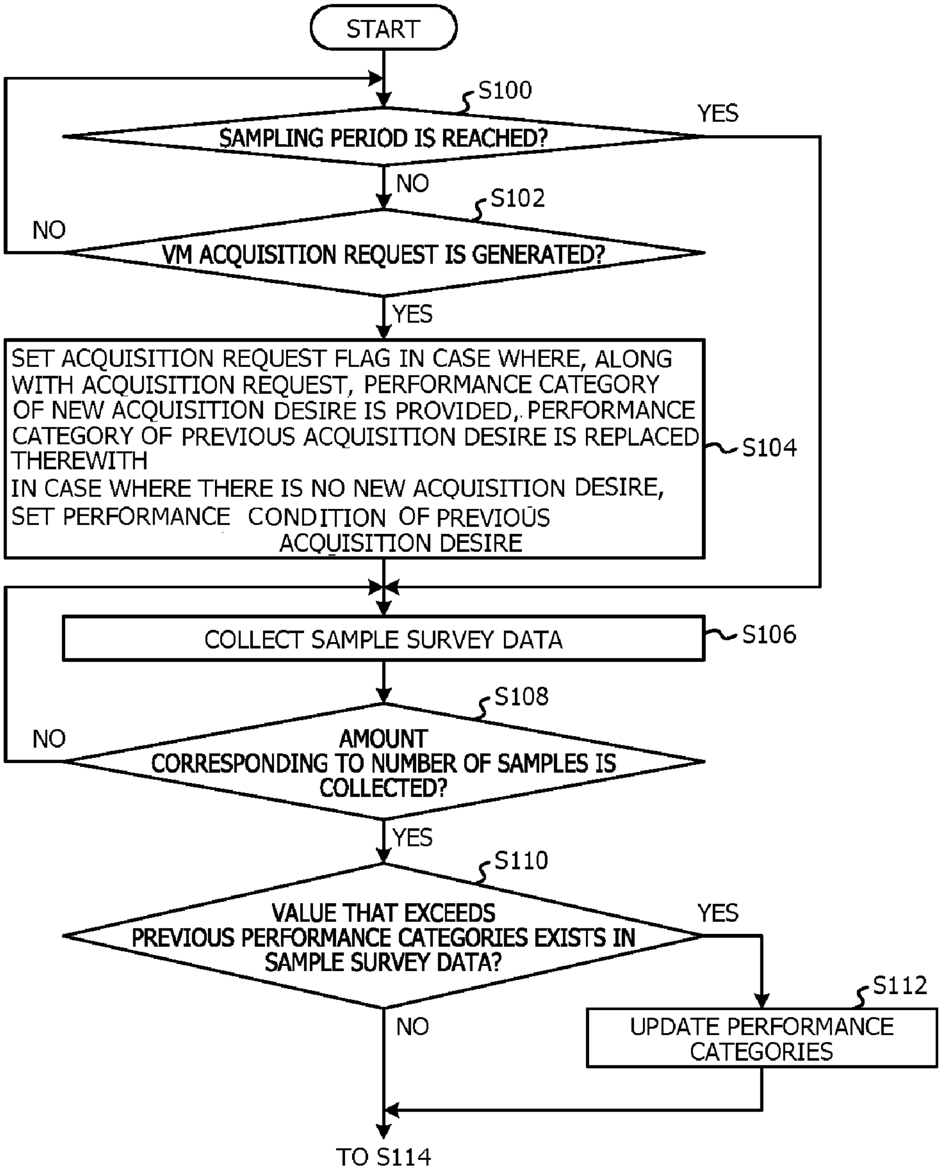
FIGS. 15A and 15B are flowcharts illustrating an example of performance measurement processing according to an embodiment.
Figure 15B:
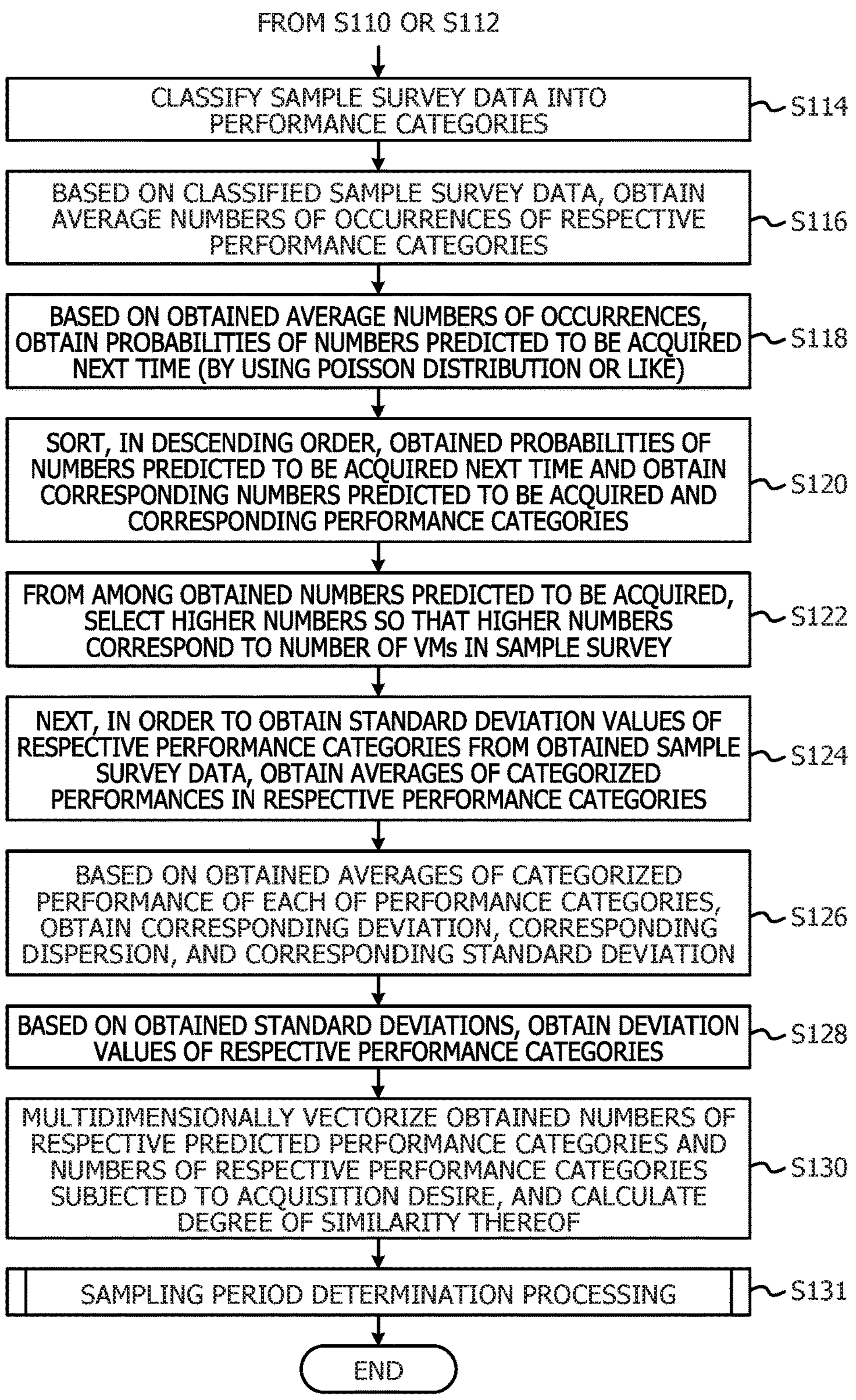
Figure 16:
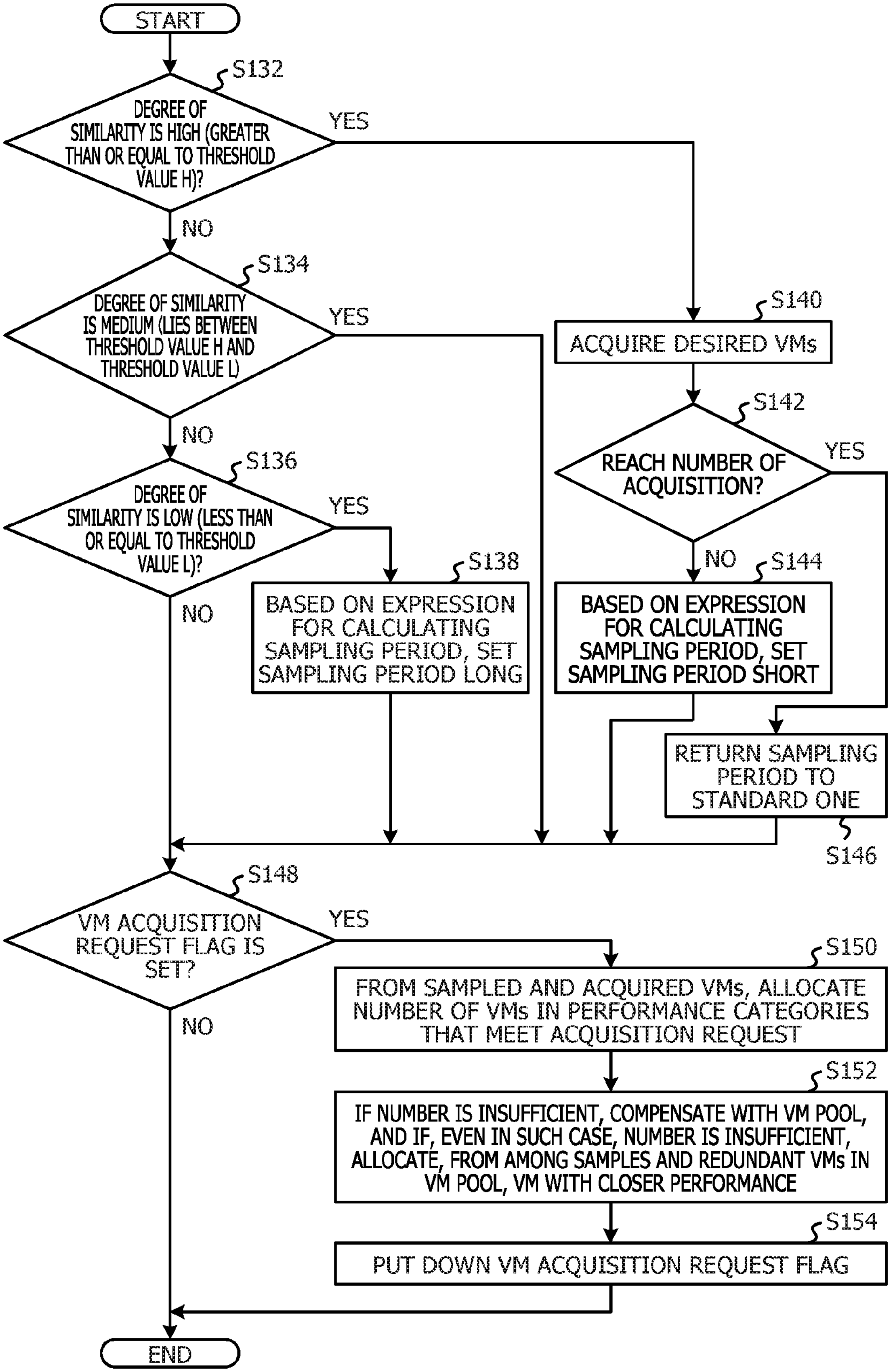
FIG. 16 is a flowchart illustrating an example of sampling period determination processing according to an embodiment.

Next, examples of a sample survey, calculation of the probability of a number predicted to be acquired next time, based on a Poisson distribution, calculation of the degree of similarity, and sampling period determination processing according to the present embodiment will be describe with reference to FIGS. 15A, 15B and FIG. 16.

The determination unit 15 determines whether the sampling period based on the sample survey data stored in the sample survey data table 31 is reached (S100). In a case of determining that the sampling period is reached, the determination unit 15 proceeds to S106.

In a case of determining that the sampling period is not reached, the determination unit 15 determines whether a VM acquisition request is generated (S102). In a case of determining that a VM acquisition request is not generated, the determination unit 15 returns to S100. In a case of determining that a VM acquisition request is generated, the determination unit 15 sets an acquisition request flag (S104).

The acquisition request flag is a flag indicating the presence or absence of generation of the VM acquisition request.

In a case where, along with the VM acquisition request, a new VM acquisition request in the performance condition 2 is issued, the performance measurement unit 14 replaces the performance category (an example of the performance condition 1) of the previous acquisition request therewith. In a case where there is no new acquisition request, the performance measurement unit 14 sets the performance condition 1 of the previous acquisition request (S104).

In S106, the performance measurement unit 14 collects sample survey data. The performance measurement unit 14 determines whether the sample survey data corresponding to the desirable number of samples is collected (S108). The performance measurement unit 14 repeatedly collects the sample survey data until the sample survey data corresponding to the desirable number of samples is collected. In a case where the performance measurement unit 14 collects the sample survey data corresponding to the desirable number of samples, the determination unit 15 determines whether a value that exceeds previous performance categories exists in the sample survey data (S110).

In a case where the determination unit 15 determines that a value that exceeds the previous performance categories exists in the sample survey data, the performance measurement unit 14 updates the number of performance categories (S112). In a case where the determination unit 15 determines that no value that exceeds the previous performance categories exists in the sample survey data, the performance measurement unit 14 classifies the sample survey data into the performance categories (S114). Next, based on the classified sample survey data, the performance measurement unit 14 obtains the average numbers of occurrences of the respective performance categories (S116). Next, based on the obtained average numbers of occurrences, the performance measurement unit 14 obtains the probabilities of numbers predicted to be acquired next time, by using a Poisson distribution expression (S118: see FIG. 6).

Next, the performance measurement unit 14 sorts, in descending order, the obtained probabilities of the numbers predicted to be acquired next time and obtains corresponding numbers predicted to be acquired and corresponding performance categories (S120: see FIG. 7). Next, from among the obtained numbers predicted to be acquired next time, the performance measurement unit 14 selects higher numbers predicted to be acquired next time, whose number is preliminarily defined, so that the number of the higher numbers predicted to be acquired next time correspond to a number in the sample survey (S122).

Next, in order to obtain standard deviation values of the respective performance categories from the obtained sample survey data, the performance measurement unit 14 obtains average values of categorized performances in the respective performance categories (S124: see FIG. 8). Next, based on the obtained average value of the categorized performance of each of the performance categories, the performance measurement unit 14 obtains a corresponding deviation, a corresponding dispersion, and a corresponding standard deviation (S126: see FIG. 8). Next, based on the obtained standard deviations, the performance measurement unit 14 obtains deviation values of the respective performance categories (S128: see FIG. 8). Next, the performance measurement unit 14 multidimensionally vectorizes the obtained numbers of the respective predicted performance categories and the numbers of respective performance categories subjected to an acquisition request, and based on Expression (3), the performance measurement unit 14 calculates the degree of similarity thereof (S130: see FIG. 9). Next, the period setting unit 16 performs determination processing for the sampling period (S131) and terminates the present processing after performing the determination processing.

An example of the sampling period determination processing will be described with reference to a flowchart in FIG. 16. If the sampling period determination processing is started, the period setting unit 16 determines whether the calculated degree of similarity is greater than or equal to the threshold value H (S132). In a case of determining that the degree of similarity is less than the threshold value H, the period setting unit 16 determines whether the degree of similarity lies between the threshold value H and the threshold value L (S134). In a case of determining that the degree of similarity lies between the threshold value H and the threshold value L, the period setting unit 16 proceeds to S148. On the other hand, in a case of determining that the degree of similarity does not lie between the threshold value H and the threshold value L, the period setting unit 16 determines whether the degree of similarity is less than or equal to the threshold value L (S136). In a case of determining that the degree of similarity is less than or equal to the threshold value L, the period setting unit 16 sets, based on Expression (4) for calculating the sampling period, the sampling period longer than the standard sampling period (S138) and proceeds to S148. In a case of determining that the degree of similarity is not less than or equal to the threshold value L, the period setting unit 16 proceeds to S148.

In a case of determining, in S132, that the calculated degree of similarity is greater than or equal to the threshold value H, the period setting unit 16 acquires requested VMs (S140). Next, the period setting unit 16 determines whether the number of acquired VMs reaches the requested number of VMs (S142). In a case of determining that the number of acquired VMs reaches the requested number of VMs, the period setting unit 16 returns the sampling period to the standard sampling period (S146) and proceeds to S148. On the other hand, in a case of determining that the number of acquired VMs does not reach the requested number of VMs, the period setting unit 16 sets, based on Expression (4) for calculating the sampling period, the sampling period shorter than the standard sampling period (S144) and proceeds to S148.

In S148, the determination unit 15 determines whether a VM acquisition request flag is set (S148). In a case of determining that the VM acquisition request flag is not set, the determination unit 15 terminates the present processing. On the other hand, in a case of determining that the VM acquisition request flag is set, the determination unit 15 allocates the number of VMs in performance categories subjected to the acquisition request, from VMs acquired as samples (S150).

In a case where the number of VMs to be allocated is insufficient, the determination unit 15 compensates with the VM pool 22. If, even in such a case, the number of VMs remains insufficient, the determination unit 15 allocates, from among samples and redundant VMs in the VM pool 22, a VM with a closer performance (S152). Next, the determination unit 15 puts down the VM acquisition request flag (S154) and terminates the present processing.

According to the virtual machine providing system 1 according to the present embodiment, in a case where it is difficult to acquire a virtual machine that meets an acquisition request, the sampling period is adjusted in accordance with a past acquisition record of virtual machines. From this, by changing a timing for checking whether a virtual machine that meets an acquisition request is able to be constructed, it is possible to efficiently acquire a virtual machine with a performance requested by a user.

Example of Hardware Configuration

Figure 17:
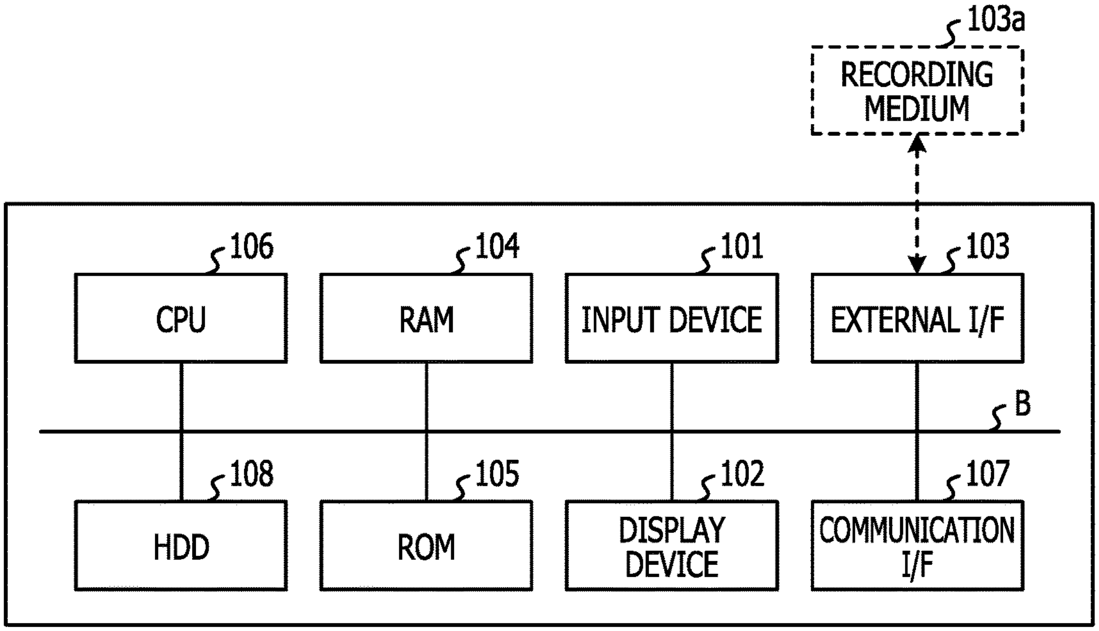
FIG. 17 illustrates an example of a hardware configuration of the virtual machine management device according to an embodiment.

Finally, a hardware configuration of the virtual machine management device 3 according to the present embodiment will be described with reference to FIG. 17. The virtual machine management device 3 includes an input device 101, a display device 102, an external I/F 103, a random access memory (RAM) 104, a read only memory (ROM) 05, a central processing unit (CPU) 106, a communication I/F 107, a hard disk drive (HDD) 108, and so forth, and these are connected to one another via a bus B.

The input device 101 includes a keyboard, a mouse, and so forth and is used for inputting individual operation signals to the virtual machine management device 3. The display device 102 includes a display and so forth and displays various kinds of processing results. The communication I/F 107 is an interface for connecting the virtual machine management device 3 to a network. From this, the virtual machine management device 3 is able to perform data communication with other apparatuses (the virtual machine acquisition device 2 and so forth) via the communication I/F 107.

The HDD 108 is a non-volatile storage device that stores therein programs and data. As the stored programs and data, there are basic software and application software that control the entire virtual machine management device 3. In, for example, the HDD 108, various kinds of databases, programs and so forth may be stored.

The external I/F 103 is an interface with external devices. As the external devices, there are a recording medium 103*a* and so forth. From this, the virtual machine management device 3 is able to perform reading from and writing into the recording medium 103*a* via the external I/F 103. As examples of the recording medium 103*a*, there are a compact disk (CD), a digital versatile disk (DVD), a SD memory card, and a universal serial bus memory (USB memory).

The ROM 105 is a non-volatile semiconductor memory (storage device) able to hold internal data even if a power supply is turned off. In the ROM 105, programs and data such as a network configuration are stored. The RAM 104 is a volatile semiconductor memory (storage device) that temporarily holds programs and data. The CPU 106 is an arithmetic device that reads, onto the RAM 104, programs and data from storage devices such as the above-mentioned HDD 108 and ROM 105 and that performs processing, thereby realizing control of an entire device and installed functions.

Based on such a configuration, in the virtual machine management device 3 according to the present embodiment, the CPU 106 performs the VM securing and performance evaluation processing and the sampling period determination processing by using data and programs stored in the ROM 105 and the HDD 108. Note that pieces of information stored in the VM pool policy DB 30, the sample survey data table 31, and the sampling period management table 32 may be stored in the RAM 104, the HDD 108, or a computer on a cloud connected to the virtual machine management device 3 via a network.

While, as above, the determination control program, the determination control method, and the virtual machine management device are described based on the above-mentioned embodiment, the determination control program, the determination control method, and the virtual machine management device according to the present technology are not limited to the above-mentioned embodiment and may be variously altered and modified within the scope of the present technology. In addition, in a case where there are the above-mentioned embodiments and examples of an alteration, these may be combined to the extent that these are consistent.

It goes without saying that the configuration of, for example, the above-mentioned virtual machine providing system 1 according to an embodiment is just an example and does not limit the scope of the present technology and various examples of a system configuration exist in accordance with uses and purposes. The number of, for example, the virtual machine acquisition devices 2 may be 1 or may be 2 or more. In a case where the virtual machine acquisition devices 2 are installed, the virtual machine management device 3 performs the VM securing and performance evaluation processing and the sampling period determination processing for a VM acquisition request from each of the virtual machine acquisition devices 2, thereby achieving adjustment of the sampling period.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer readable medium having stored therein a program that causes a computer to execute a process, the process comprising:

receiving an acquisition request including a performance condition that requests a first virtual machine;

performing a first determination in response to the acquisition request to determine whether the first virtual machine that satisfies the performance condition can be constructed on one of physical machines by referring to operation statuses of the physical machines;

in a case where the first virtual machine that satisfies the performance condition cannot be constructed in the first determination, setting a determination period for determining whether the first virtual machine that satisfies the performance condition can be constructed within a time interval at which the second virtual machine that satisfies the performance condition is determined to be able to be constructed based on a determination history of whether a second virtual machine that satisfies the performance condition can be constructed;

performing, after elapse of a time period corresponding to the determination period, a second determination to determine whether the first virtual machine that satisfies the performance condition can be constructed;

in a case where the first virtual machine that satisfies the performance condition is determined to be able to be constructed in the second determination, constructing a virtual machine corresponding to the acquisition request for the first virtual machine in one of the physical machines;

calculating a degree of similarity to a configuration of the second virtual machine that satisfies the performance condition for a next virtual machine to be requested based on a virtual machine configuration predicted from the determination history; and setting the determination period, based on the degree of similarity.

2. The non-transitory computer readable medium according to claim 1, wherein the determination period is set to a shorter period in a case where the degree of similarity is larger, and is set to a longer period in a case where the degree of similarity is smaller.

3. The non-transitory computer readable medium according to claim 1, wherein the determination period is set to a shorter period in a case where number of virtual machines used for the first determination becomes smaller.

4. The non-transitory computer readable medium according to claim 1, wherein in a case where the first virtual machine that satisfies the performance condition is determined to be able to be constructed in the first determination, the determination period is set to a shorter period.

5. A method comprising:

receiving, by a processor, an acquisition request including a performance condition that requests a first virtual machine;

performing, by the processor, a first determination in response to the acquisition request to determine whether the first virtual machine that satisfies the performance condition can be constructed on one of physical machines by referring to operation statuses of the physical machines;

in a case where the first virtual machine that satisfies the performance condition cannot be constructed in the first determination, setting, by the processor, a determination period for determining whether the first virtual machine that satisfies the performance condition can be constructed within a time interval at which the second virtual machine that satisfies the performance condition is determined to be able to be constructed based on a determination history of whether a second virtual machine that satisfies the performance condition can be constructed;

performing, by the processor, after elapse of a time period corresponding to the determination period, a second determination to determine whether the first virtual machine that satisfies the performance condition can be constructed;

in a case where the first virtual machine that satisfies the performance condition is determined to be able to be constructed in the second determination, constructing, by the processor, a virtual machine corresponding to the acquisition request for the first virtual machine in one of the physical machines;

calculating, by the processor, a degree of similarity to a configuration of the second virtual machine that satisfies the performance condition for a next virtual machine to be requested based on a virtual machine configuration predicted from the determination history; and setting the determination period, based on the degree of similarity.

6. The method according to claim 5, wherein the determination period is set to a shorter period in a case where the degree of similarity is larger, and is set to a longer period in a case where the degree of similarity is smaller.

7. The method according to claim 5, wherein the determination period is set to a shorter period in a case where number of virtual machines used for the first determination becomes smaller.

8. The method according to claim 5, wherein in a case where the first virtual machine that satisfies the performance condition is determined to be able to be constructed in the first determination, the determination period is set to a shorter period.

9. A management device comprising:

a memory; and a processor coupled to the memory and configured to:

receive an acquisition request including a performance condition that requests a first virtual machine;

perform a first determination in response to the acquisition request to determine whether the first virtual machine that satisfies the performance condition can be constructed on one of physical machines by referring to operation statuses of the physical machines;

in a case where the first virtual machine that satisfies the performance condition cannot be constructed in the first determination, set a determination period for determining whether the first virtual machine that satisfies the performance condition can be constructed within a time interval at which the second virtual machine that satisfies the performance condition is determined to be able to be constructed based on a determination history of whether a second virtual machine that satisfies the performance condition can be constructed;

perform, after elapse of a time period corresponding to the determination period, a second determination to determine whether the first virtual machine that satisfies the performance condition can be constructed;

in a case where the first virtual machine that satisfies the performance condition is determined to be able to be constructed in the second determination, construct a virtual machine corresponding to the acquisition request for the first virtual machine in one of the physical machines;

calculate a degree of similarity to a configuration of the second virtual machine that satisfies the performance condition for a next virtual machine to be requested based on a virtual machine configuration predicted from the determination history, and set the determination period, based on the degree of similarity.

10. The management device according to claim 9, wherein the processor is configured to set the determination period with shorter period in a case where the degree of similarity is larger, and set the determination period with longer period in a case where the degree of similarity is smaller.

11. The management device according to claim 9, wherein the processor is configured to set the determination period with shorter period in a case where number of virtual machines used for the first determination becomes smaller.

12. The management device according to claim 9, wherein the processor is configured to set the determination period with shorter period in a case where the first virtual machine that satisfies the performance condition is determined to be able to be constructed in the first determination.

* * * * *